US009424690B2

(12) United States Patent
Nehmadi et al.

(10) Patent No.: US 9,424,690 B2
(45) Date of Patent: Aug. 23, 2016

(54) METHOD FOR TRANSLATING THE LOCATION, ORIENTATION AND MOVEMENT OF A PREDEFINED OBJECT INTO COMPUTER GENERATED DATA

(71) Applicants: Youval Nehmadi, Nili (IL); Dafna Danon, Nili (IL)

(72) Inventors: Youval Nehmadi, Nili (IL); Dafna Danon, Nili (IL)

(73) Assignees: Youval Nehmadi, Nili (IL); Dafna Danon, Nili (IL)

( * ) Notice: Subject to any disclaimer, the term of this patent is extended or adjusted under 35 U.S.C. 154(b) by 177 days.

(21) Appl. No.: 14/097,390

(22) Filed: Dec. 5, 2013

(65) Prior Publication Data
US 2014/0160117 A1    Jun. 12, 2014

Related U.S. Application Data

(63) Continuation-in-part of application No. PCT/IL2012/000238, filed on Jul. 14, 2012.

(60) Provisional application No. 61/496,594, filed on Jun. 14, 2011.

(51) Int. Cl.
*G06T 19/20* (2011.01)
*G06F 3/03* (2006.01)
*G06T 7/00* (2006.01)

(52) U.S. Cl.
CPC ............ *G06T 19/20* (2013.01); *G06F 3/0304* (2013.01); *G06T 7/0042* (2013.01); *G06T 7/0046* (2013.01); *G06T 2207/30204* (2013.01)

(58) Field of Classification Search
None
See application file for complete search history.

(56) References Cited

U.S. PATENT DOCUMENTS

| 6,364,209 | B1 * | 4/2002 | Tatsuta | G06K 7/1443 235/435 |
| 7,833,100 | B2 * | 11/2010 | Dohta | A63F 13/10 348/158 |
| 2005/0069196 | A1 * | 3/2005 | Uchiyama | G06K 9/3216 382/154 |
| 2010/0194863 | A1 * | 8/2010 | Lopes | G06T 7/0061 348/50 |

* cited by examiner

*Primary Examiner* — Said Broome
(74) *Attorney, Agent, or Firm* — Reches Patents

(57) ABSTRACT

A method, comprising: obtaining an image data of a physical object; the physical object comprises a plurality of markers positioned on the outer surface of the physical object; analyzing, using a computer, the data, to identify visual markers information indicative of at least some of a plurality of markers; determining an orientation and a location of the physical object in response to predefined attributes of the plurality of markers and to the visual markers information.

19 Claims, 27 Drawing Sheets

System Location in space

| Movement Mode | Concept | Input Parameter | Translation | Emulate |
|---|---|---|---|---|
| Absolute 3D | No emulation, the application uses the Wander's direct 3D parameters | X | Real X in cm | |
| | | Y | Real Y in cm | |
| | | Z | Real Z in cm | |
| | | $X_r$ | Real angle | |
| | | $Y_r$ | Real Angle | |
| | | $Z_r$ | Real Angle | |
| Absolute Location | The cursor follows the Wander object | X | Projection of X $X_p = c * X / Z$ | Cursor $X = X_p$ |
| | | Y | Projection of Y $Y_p = c * Y/Z$ | Cursor $Y = Y_p$ |
| | | Z | $\delta Z$ | Zoom $= \delta Z$ |
| Absolute angle | The Wander object points to where the cursor should go. | $X_r$ | Angle of tilt | Cursor $X = X_r$ |
| | | $Y_r$ | Angle of tilt | Cursor $Y = Y_r$ |
| | | $Z_r$ | Angle of twist | Zoom $= Z_r$ |
| Relative Location | Very similar to a mouse any change in movement will be sent | X | Projection of X $X_p = c * X / Z$ $\delta X = X_p$-prev $X_p$ | Cursor $X = X + \delta X_p$ |
| | | Y | Projection of Y $Y_p = c * Y / Z$ $\delta Y = Y_p$-prev $Y_p$ | Cursor $Y = Y + \delta Y_p$ |
| | | Z | $\delta Z = Z - $ prev$Z$ | Mouse wheel |
| Relative angle | Any change in angle suggests a movement. | $X_r$ | $\delta X = c*(X_r$-prev $X_r)$ | Cursor $X = X + \delta X$ |
| | | $Y_r$ | $\delta Y = c*(Y_r$-prev $Y_r)$ | Cursor $Y = Y + \delta Y$ |
| | | $Z_r$ | $\delta Z = c*(Z_r$-prev $Z_r)$ | Zoom adds $\delta Z$ |
| Speed Location | Go to the direction of the object | X | $X_{speed} = c*X$ | Cursor $X = X_{speed}$ |
| | | Y | $Y_{speed} = c*Y$ | Cursor $Y = Y_{speed}$ |
| | | Z | $Z_{speed} = c*Z$ | Cursor $Z = Z_{speed}$ |
| Speed Angle | Go to the direction the object is pointing | $X_r$ | $X_{speed} = c*X_r$ | Cursor $X = X_{speed}$ |
| | | $Y_r$ | $Y_{speed} = c*Y_r$ | Cursor $Y = Y_{speed}$ |
| | | $Z_r$ | $Z_{speed} = c*Z_r$ | Cursor $Z = Z_{speed}$ |

FIG. 30

| Object movement | Translate to audio |
|---|---|
| X Location | Change instrument |
| Y Location | Volume |
| Z Location | Tone |
| $Y_r$ Angle (Tilting sideways) | Treble |
| $X_r$ Angle (Tilting up and down) | Tempo |
| $Z_r$ Angle (Twisting) | Echo |

FIG. 31

36001　　　　　　　　　36002
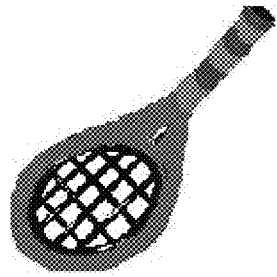 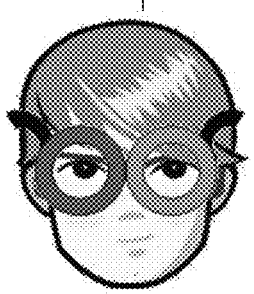
FIG. 36
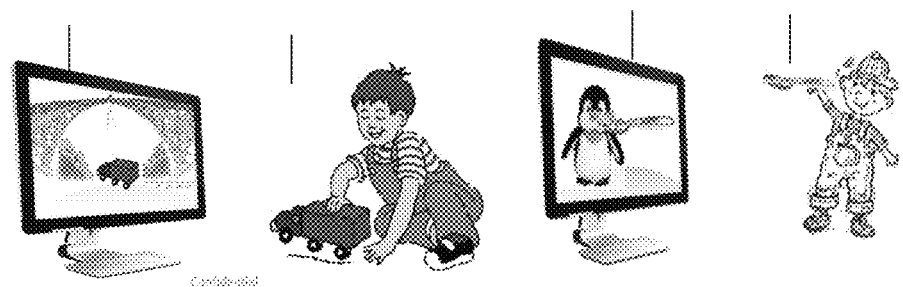
FIG. 37
38001　　　　　　　　38002
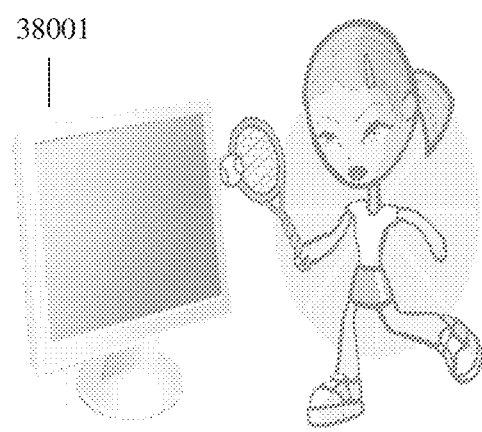 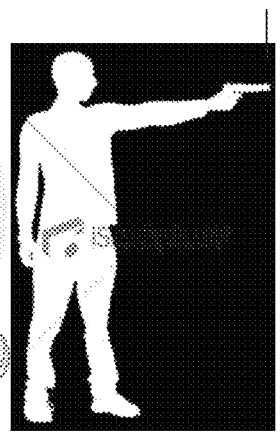
FIG. 38

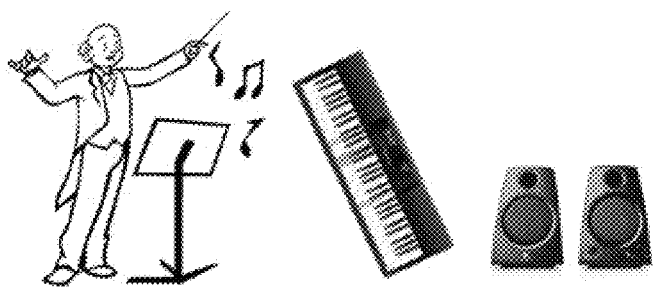
FIG. 44
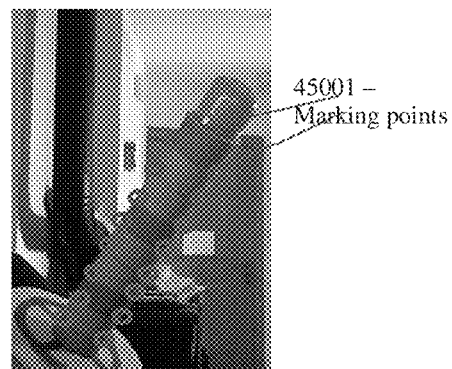
FIG. 45 - Markings for auto calibration

METHOD FOR TRANSLATING THE LOCATION, ORIENTATION AND MOVEMENT OF A PREDEFINED OBJECT INTO COMPUTER GENERATED DATA

RELATED APPLICATIONS

This application is a continuation in part of PCT patent application PCT/IL2012/000238 international filing date Jul. 14, 2012 which claims priority from U.S. provisional patent 61/496,594 filing date Jul. 14, 2011, both being incorporated herein by reference.

FIELD OF THE INVENTION

The invention relates to simple input devices for computers, well suited for use with graphically intensive activities, and operating by optically sensing object or human positions and/or orientations. The invention in many preferred embodiments uses real time web camera whose output is analyzed and used as input to a personal computer.

BACKGROUND OF THE INVENTION

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms may be the Sony PlayStation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced and not complicated user interactivity with game play. Simple low cost interactive tools that are user friendly and intuitive with no need to install hardware or perform complex settings.

SUMMARY OF THE INVENTION

The present invention comprises in one aspect a method for translating a location and an orientation of a predefined object into a virtual location and an orientation of a virtual object. The method includes providing a physical object having a plurality of markers positioned on the outer surface of the physical object, thus creating a predefined object, obtaining an image data of the predefined object, providing an object description file comprising a predefined table of the plurality of markers positioned on the outer surface of the predefined object, analyzing, using a computer containing the object description file, the obtained image data and identifying the plurality of markers, analyzing, using a computer containing the object description file, the obtained image data and based on the fitting of the plurality of identified markers to the predefined object topology, extracting the orientation and the location of the predefined object.

The present invention may additionally comprise a step of generating a movement of a virtual object, wherein the generation of the movement of the virtual object is based on the extracted orientation and location of the predefined object.

In second aspect of the invention, there is provided a method for translating a location and an orientation of a predefined object into a computer generated output. The method includes providing a physical object having plurality of markers positioned on the outer surface of the physical object, thus creating a predefined object, obtaining an image data of the moving predefined object, providing an object description file comprising a predefined table of the plurality of markers positioned on the outer surface of the predefined object, analyzing, using a computer containing the object description file, the obtained image data and identifying the plurality of markers, analyzing using a computer containing the object description file, the obtained image data and based on the fitting of the plurality of identified markers to the predefined object topology, extracting the orientation and the location of the predefined object, generating an output, wherein the generation of the output is based on the extracted orientation and location of the predefined object.

In third aspect of the invention, there is provided a computer based system for detecting a location and an orientation of a predefined object. The system comprises a predefined object having plurality of markers positioned on the outer surface of the predefined object, a 2D color camera that obtains an image data concerning a location and an orientation of the predefined object, a computer connected to the 2D color camera, a driver located on the computer and comprising a predefined table of plurality of markers positioned on the outer surface of the predefined object, and configured to analyze the obtained image data and to generate data containing coordinates of the predefined object in six degrees of freedom or less.

Fast movements of the object are analyzed by the trail of the object, captured by the camera during the frame.

According to an embodiment of the invention there may be provided a non-transitory computer readable medium that stores instructions that once executed by a computer cause the computer to perform the stages of: obtaining an image data of a physical object; the physical object comprises a plurality of markers positioned on the outer surface of the physical object; analyzing, using a computer, the data, to identify visual markers information indicative of at least some of a plurality of markers; determining an orientation and a location of the physical object in response to predefined attributes of the plurality of markers and to the visual markers information.

Any reference to a method should be regarded as a reference to a non-transitory computer readable medium and vise verse.

According to an embodiment of the invention there may be provided a method that may include obtaining an image data of a physical object; the physical object comprises a plurality of markers positioned on the outer surface of the physical object; analyzing, using a computer, the data, to identify visual markers information indicative of at least some of a plurality of markers; determining an orientation and a location of the physical object in response to predefined attributes of the plurality of markers and to the visual markers information.

The method may include generating a movement of a virtual object, wherein the generation of the movement of the virtual object is based on the extracted orientation and location of the predefined object.

The plurality of markers may maintain a fixed spatial relationship.

The image data may include visual information indicative of a movement of the predefined object; and tracking a movement of the predetermined object.

The visual information indicative of the movement of the predefined object may include radiation emitted from at least one of the plurality of markers.

The visual information may include a blurred image of the predefined object.

The image data does not may include an identifiable image of the predefined object.

The analyzing may include searching in the image data image patterns that match expected image patterns to be formed by the plurality of markers.

The method may include triggering a predetermined response to a detection of predefined changes in light emitted by at least one marker of the plurality of markers.

The method may include selecting a selected filtering process to be applied during the analyzing of the image data and applying the selected filtering process. The selection may be based upon an application.

The method may include triggering a selected response to the extracted orientation and location of the predefined object.

The method may include selecting the selected response by applying a mapping between the extracted orientation and location of the predefined object and between the selected response.

The method may include selecting a mapping out of multiple mappings.

The method may include analyzing the data to detect an optical code formed by multiple predefined emissions of light by the object during a time window.

The method may include calibrating one or more camera parameters in response to image data of multiple markers and known spatial relationship between the multiple markers.

The method may include: obtaining image data of a plurality of physical objects; each physical object may include a plurality of markers positioned on the outer surface of the physical object; analyzing, using a computer containing the object description file, the data, to identify visual markers information indicative of at least some of a plurality of markers of the plurality of physical objects; determining an orientation and a location of each of the plurality of physical object in response to predefined attributes of the plurality of markers of the physical object and to the visual markers information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 30 is a movement translation table according to an embodiment of the invention;

FIG. 31 is a translation table for audio output according to an embodiment of the invention;

FIG. 36 Are examples for objects—bat and glasses according to an embodiment of the invention;

FIG. 37 Implementation of Projection of object into a virtual world according to an embodiment of the invention;

FIG. 38 A six dimension general object remote input device according to an embodiment of the invention;

FIG. 44 is an examples translating the result to an Audio unit: Conducting and creating music according to an embodiment of the invention;

FIG. 45 is a perspective view of the calibration points extracted from the object identification method to calibrate the camera parameters according to an embodiment of the invention.

Figure 1:
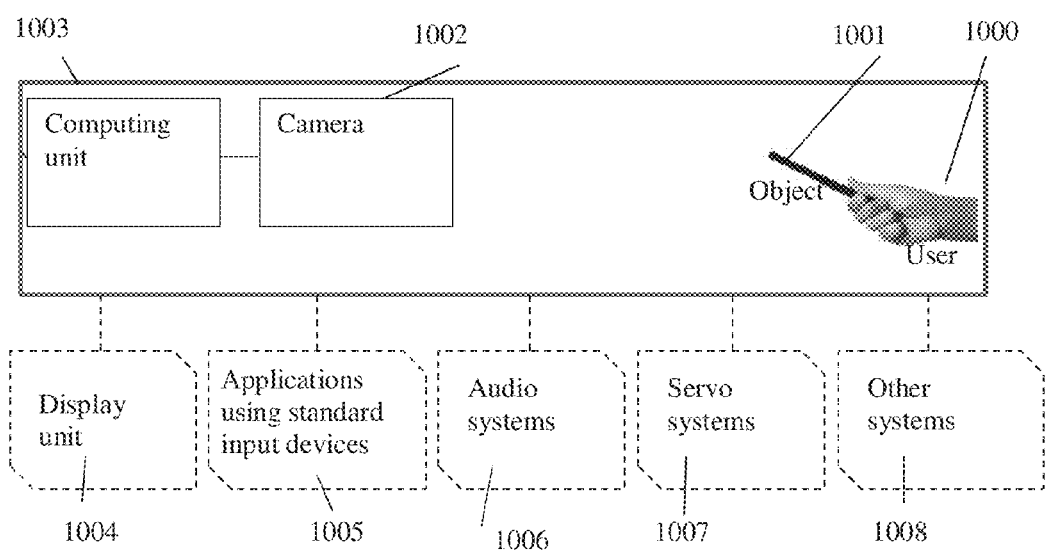
FIG. 1 is a view of an embodiment of the 3D remote input device according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

DEFINITION

Computer—includes servers, phones, smartphones, pad, tablets, pod, television or electronic applicant that can be connected to camera.

Predefined object—any solid object that is predefined in a way that, according to the invention, its position and orientation in space can be identified.

Generic objects—A generic object is any predefined object that can be used on any application, Wand, wheel, pen, etc.

Specific objects—A specific object is a predefined object that is created especially for a certain application and cannot work on other applications, a spoon to feed a pet, a special gun or sward.

Object description file—Is an XML file that holds a full description of an object in a format that enables the invention to identify the object at least at one side and define the location of the object in space.

A marker is any area at a specific location on the object that may include at least one, visually distinguishable, characteristic feature, such as color, pattern, shape, or light emitting at a certain wavelength range.

The device may be provided a two or three dimensional image.

The device is a remote 3D input device, shown in FIG. 1.

The system is comprised of a user 1000 held object 1001 that is captured by a standard 2D camera 1002 and processed in a computing unit 1003. The computing unit produces the position and orientation parameters of the object in space, and whether any of the object keys have been pressed.

This Output can be used either by a display unit 1004 for the object to control applications or to be projected in a display, the output can be translated to standard input devices and control any applications using standard input devices 1005 to emulate them from afar. Also the output can be translated to an audio system 1006) to produce sounds or music.

The output can be translated to a servo system 1007) to operate machinery or robots.

The output can be used for any other system 1008) that requires input.

System

Figure 2:
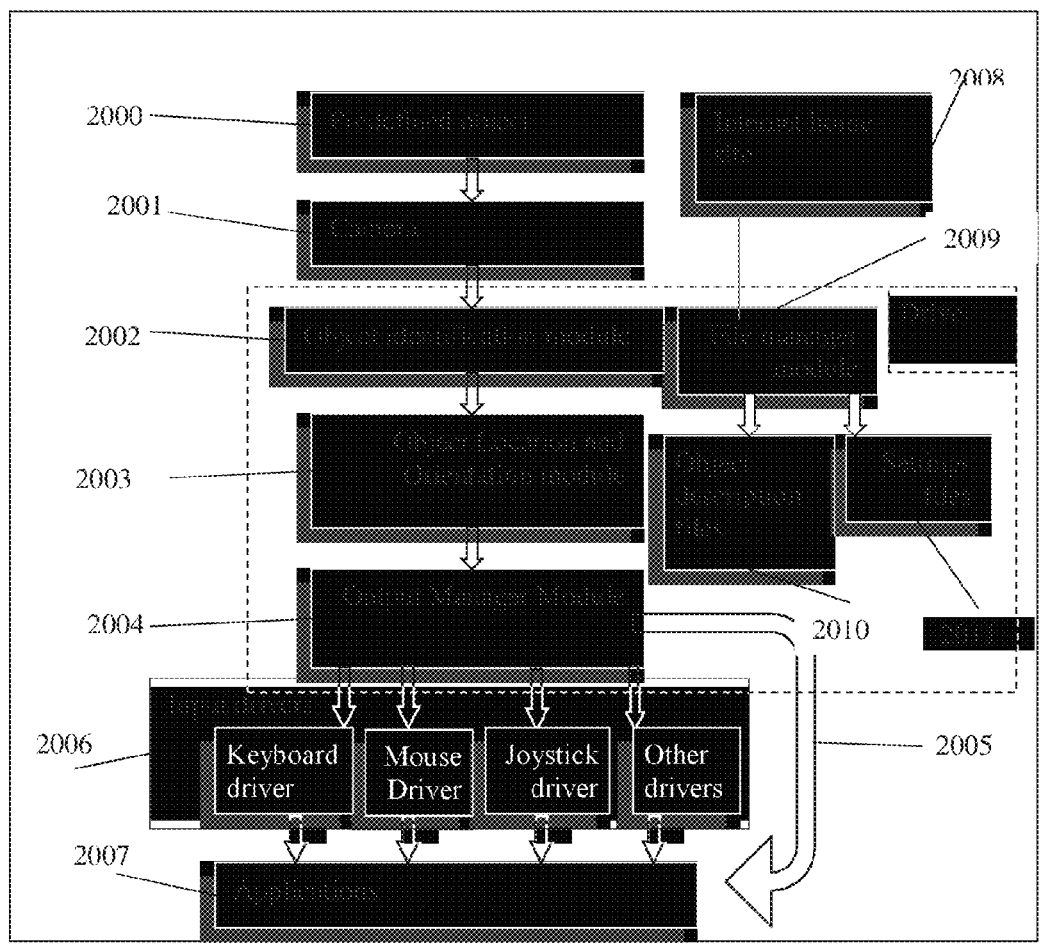
FIG. 2 is a schematic diagram of the system design according to an embodiment of the invention.

The system diagram, shown in FIG. 2, describes the system to deliver the behavior of a chosen predefined object 2000 as input data 2005 to serve any application or appliance.

The predefined object 2000 must be one of a set of objects whose description file must be included in the module of settings and "object description" files 2010. The object is maneuvered by a user in front of a camera 2001.

The object identification module 2002 receives frames from the 2D camera 2001 and performs a process to identify the object in the frame.

The Object Location and orientation module 2003 receives the identification results from the previous module and calculates the location of the object in 3D and its orientation around the Z, Y and X axis. It also extracts the state of the LED indicating whether a button on the object was pressed.

The result of "object location and orientation module 2003 enters the output manager module 2004.

The output manager module manipulates the objects movement/position and button state according to information derived from the current 'Settings file' 2011.

The 'Output manager module' provides an interrupt base interface and polling interface for providing the input of the current invention 2005 to any applications 2007. This is for applications to use the input directly from the driver, In addition to this embodiment, the 'Output manager' can direct some of the result to activate standard input drivers 2006, such as keyboard, mouse, joystick, touchscreen, etc. This manipulation of the data is called 'Standard input emulation'.

All sites & applications 2007, that await input from standard input devices, can be activated by emulating these devices.

In addition to this embodiment, a file management module 2009 can be added to direct and manage the 'object description files' 2010 and the 'Settings' files 2011.

The 'file management module' contains also a LUT (look up table) to map as many, common, sites and applications to 'settings' files.

The 'file management module' 2009 can be connected via the internet to a home base site to perform updates and acquire or change the LUT or the lists of 'object description files' and Setting files.

A list of 'Object description files' 2010—In addition to the base embodiment, following a primary object, a list of file, describing different objects, can be listed. The 'file manager module' 2009 manages them and presents the 'Object identification module' 2002 and the 'Object location & Orientation module' 2003 with a file to search and follow.

A list of 'Settings files' 2011)—In addition to the base embodiment, using only one 'default settings', a list of files, describing for the 'Output module' what filters to use, which mode of movement and what movements to emulate, can be listed.

The 'file manager module' 2009) manages them and chooses (through a LUT) which file to use according to the currently running application or the current internet site.

System Layout

In FIG. 2 the apparatus is a driver that is installed on the computing unit. It captures frames from the camera, continuously, searching for an object and providing input to any application running according to the objects movement.

Figure 3:
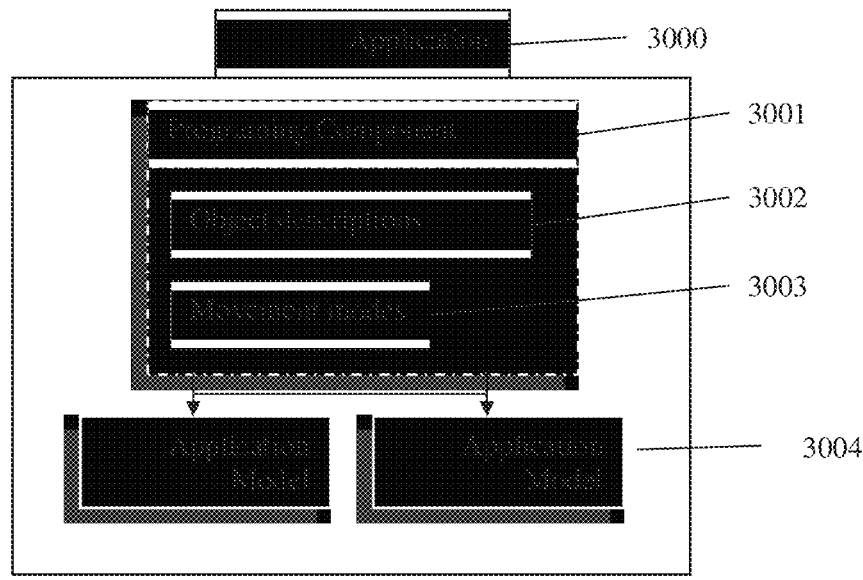
FIG. 3 is a schematic diagram of an embodiment where the present invention is used as a component in another application.

Another embodiment is shown in FIG. 3. The apparatus is a programming component 3001).

The component 3001) can be embedded into an application 3000). The component includes all the required object-descriptions 3002) and the required movement modes 3003).

The component is built into a DLL file that can be embedded into applications. If a similar or higher version is already installed on the computer, then the application will use the device on the system; otherwise it will use the DLL that is embedded in it. Embedding the invention as a component allows the application to work with the method independently without setting anything.

Figure 4:
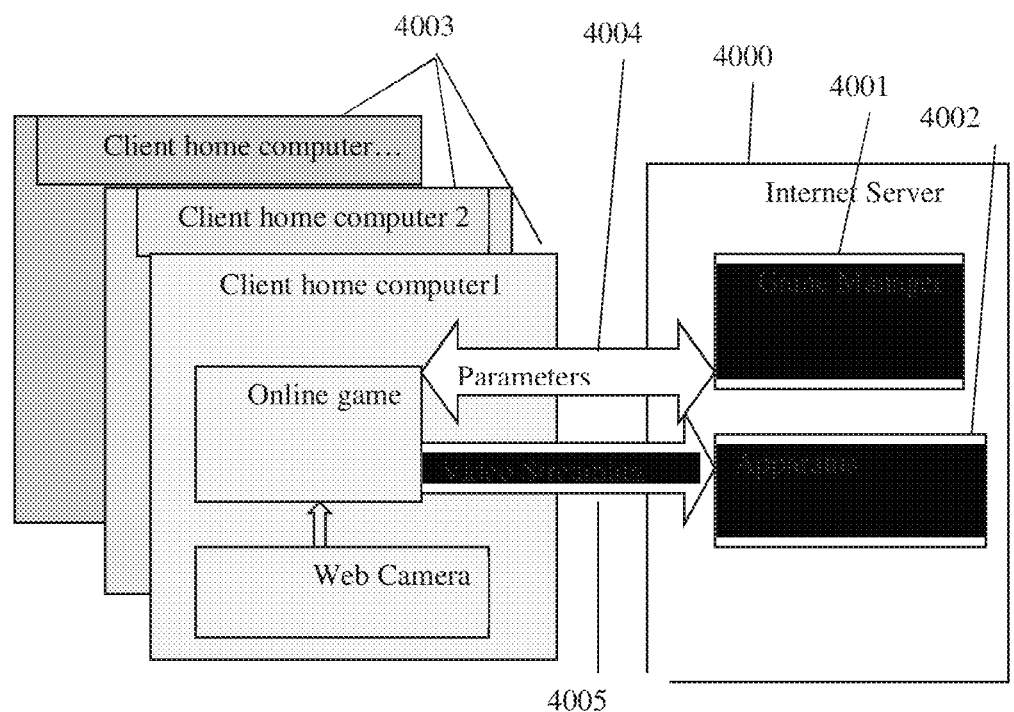
FIG. 4 is a schematic diagram of an embodiment where the present invention works on a server as an internet service.

Another embodiment is shown in FIG. 4. The apparatus (4002) runs on an internet server (4000) and provides service to client home computers (4003).

The Web application transfers the video streaming (4005) via the Web. Each frame of each client-computer is analyzed independently and the actions and/or locations are sent back online as parameters (4004) to each client.

Object Identification Module

Figure 5:
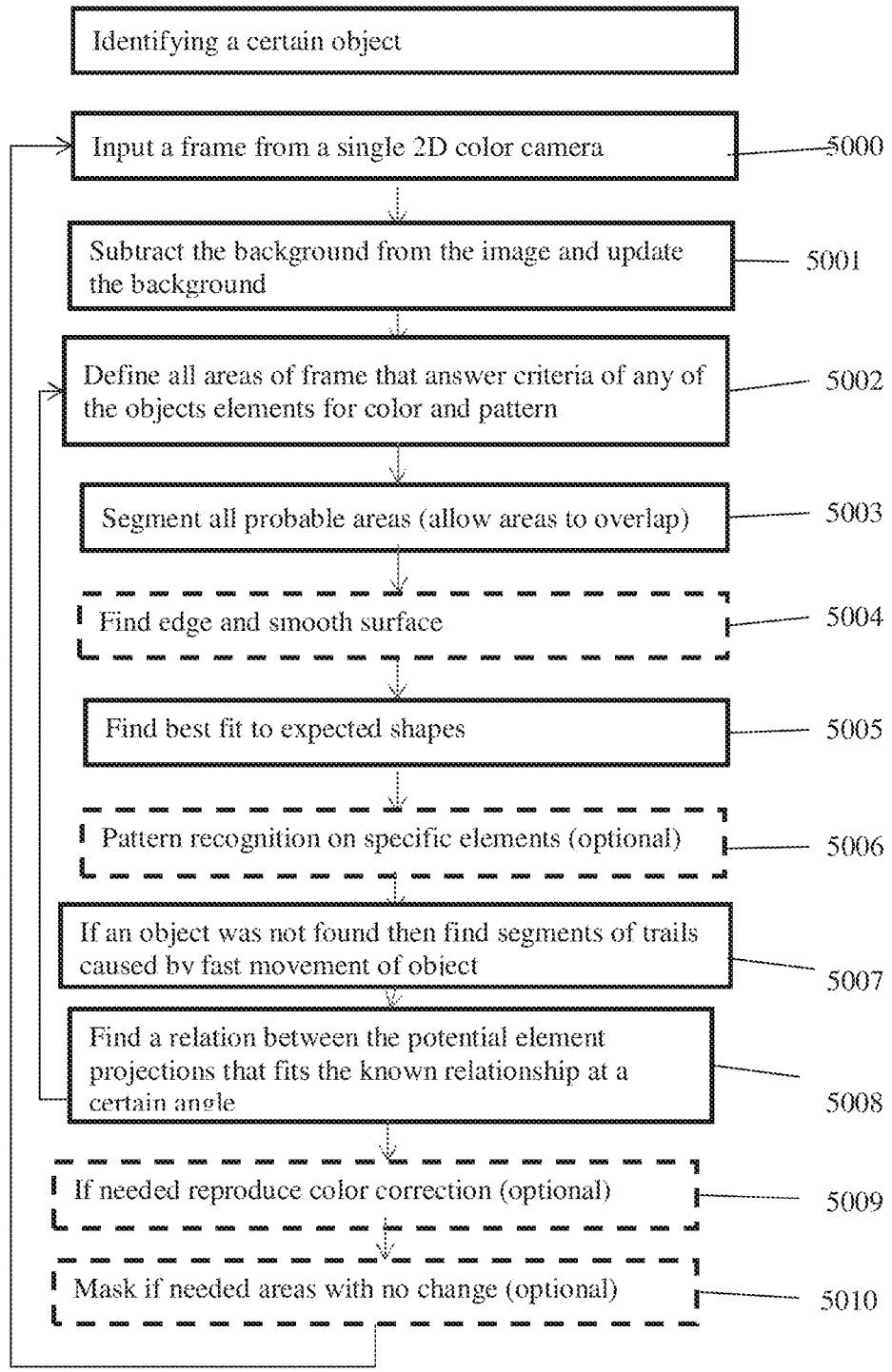
FIG. 5 is a flowchart of an exemplary method for identifying a predefined object in a frame, according to an embodiment of the invention.

FIG. 5 describes the flow of identification

Figure 6:
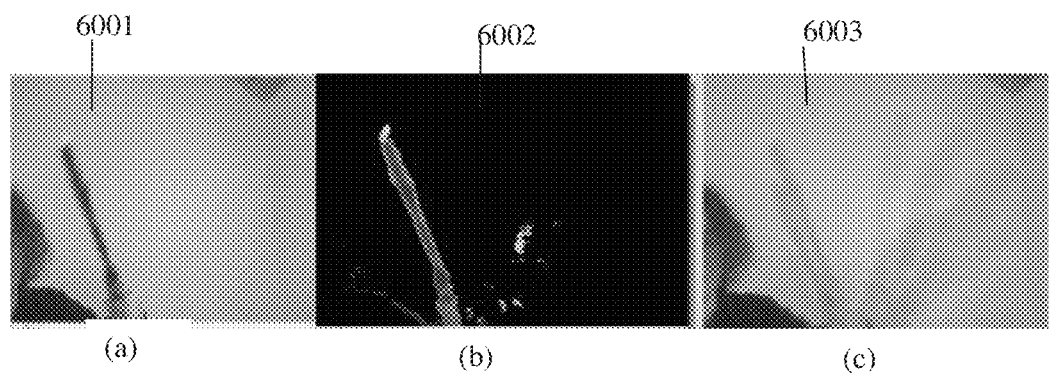
FIG. 6 is a perspective view of the Background removal stages of the object identification method according to an embodiment of the invention.

FIG. 6 shows an example of identifying a 'Wand' object.

i. Input (5000)

Input of a flow of frames from a single camera (5000).

The program chooses the default camera, or a camera chosen by the user, seeks the info of the camera, including the rate of the frames. All analysis runs on a timer depending on the camera frequency.

Analysis is run according to a defined rate. If the process of a frame is not yet finished by the time the next process is about to begin, the process of next frame is then skipped.

The program should be able to run the same on any system, so the input parameters of the camera should be checked and downgraded.

High resolution cameras will only be a burden on the analysis, if frames are larger than 640×480 then resize them.

Program needs to flip the input picture horizontally so that it acts as a mirror. Users expect intuitively that the virtual world in front of them will correspond as a mirror to the real world.

The analysis of the frames should be about 30 Hz, no need for a faster frequency. The rate could be changed on the setting form if required.

i. Background (5001)

A special method for updating the background and subtracting the background from each image is used to eliminate many disturbing elements surrounding the user and the object.

For subtracting the background from the image (6001) a parameter is used to define the flexibility of the background removal. The parameter acts as a threshold: for each pixel if the color difference, between the current image and the background image, is larger than the threshold then the pixel is not part of the background.

$$\text{Result\_Image}_{x,y} = |\text{Current\_Image}_{x,y} - \text{Background\_Image}_{x,y}|$$

$$\left\{ \begin{array}{l} > \text{Threshold} \Rightarrow \text{Current\_Image}_{x,y} \\ \leq \text{Threshold} \Rightarrow 0 \end{array} \right\}$$

Dynamic Background Removal:

Instead of having a fixed threshold for all values of color, the threshold is set to be adjusted according to the value of the colors at each pixel. In areas of bright light, pixel values tend to fluctuate much more than in darker areas, so the threshold should be larger in brighter areas.

Background Update:

For updating the background another parameter is used, Update_par, this parameter defines how fast the background image should be sent.

$$\text{Background}_{Image_{x,y}} = \text{Background}_{Image_{x,y}} + \left| \frac{(\text{Background}_{Image_{x,y}} - \text{Current\_Image}_{x,y})}{\text{Update}_{par}} \right|$$

i. Threshold (5002)

This step filters through only pixels that answer any of a list of color or pattern constraints described in the predefined object structure.

According to the item we are searching for, the program holds a list of all the elements it should identify including their shape and color.

The list of shapes that describe the patches we use to diagnose the item include coloring.

The specifications, of the colors, of a shape, are described by the relationship between Red Green and Blue or by H, S and V. To solve variations of lighting and material of object For each pixel, if it answers the requirements for a certain constraint then add the pixel to the relative element list.

Figure 7:
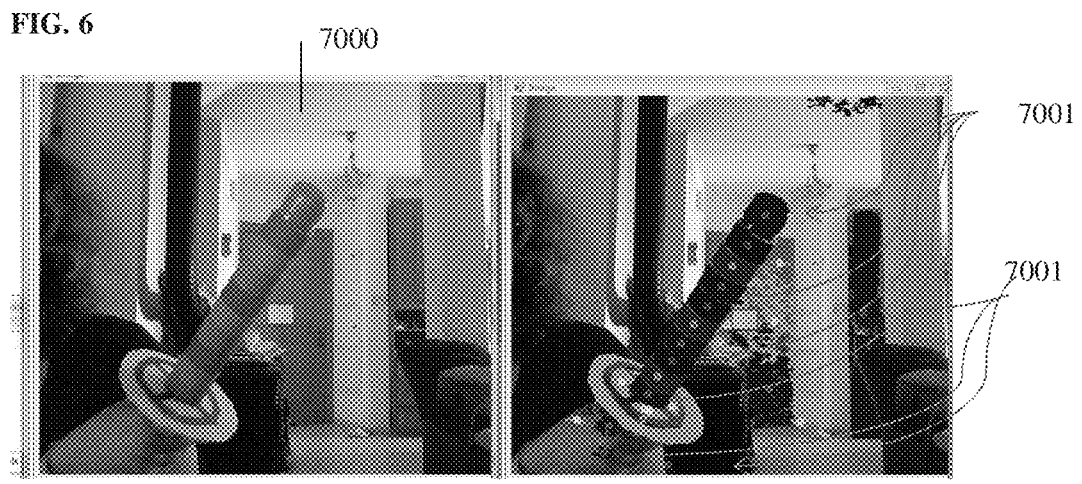
FIG. 7 is a perspective view of the Threshold and segmentation stages of the object identification method according to an embodiment of the invention.

For the Wand for instance, a definition for the red, green, blue and yellow element colors was defined as shown in FIG. 7.

i. Segmentation (5003)

Creating a list of segments from the frame for each of the colors or patterns we are searching for.

This is a process that is very similar to the blob segmentation.

Each group of points, of one color constraint, is gathered to a segment. If the segment is smaller than a certain size then remove the segment.

A segment is a group of points who all have neighboring points in the same group.

In FIG. 6 all the segments that are large enough are shown.

In the example in FIG. 7, segments of red color where found, some are of elements (7002), some are of the environment (7003).

i. Segment Edge (5004)

Receives lists of segments and retrieves the edge of each segment.

Extract from each segment the points which are missing one or more neighbors. This services the shape recognition. As the shape of an element is optional, this is done only when the segment is identified by a shape.

i. Shape Detection (5005)

After creating the segments for each of the elements color constraints, the shape detection will filter through only segments that are close enough to the requires shape.

i. Pattern Recognition (5006)

If the element has a pattern then a Daisy procedure is performed on the chosen segments to find the pattern, when the pattern is found it identifies the segment as the right element and helps to find the proper orientation of the element.

i. Location of Elements (5008)

After acquiring all the potential elements we now actually identify the segments that represent our object from one of the angles.

Figure 8:
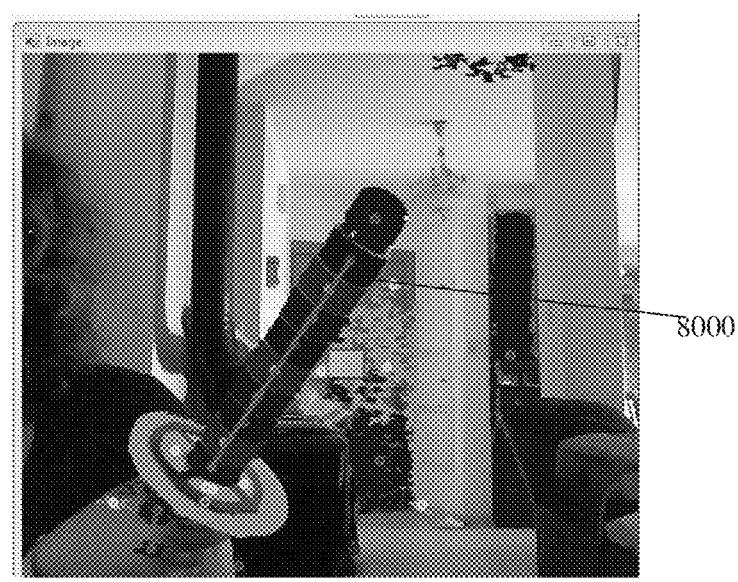
FIG. 8 is a perspective view of the element matching stage of the object identification method according to an embodiment of the invention.

In the example of the Wand as described in FIG. 8, the procedure identified the 9 elements of the stick which correspond to the perpendicular angles of the wand (8000).

This procedure accepts lists of segments produced the segmentation step.

Each list corresponds to an element color constraints, for each of the elements of the object as observed from all sides.

Each list contains a list of segments. The search is executed as a tree and starts at the more defined and dominant elements.

Starting from each segment of the first element, the procedure runs through each segment of the second element. Note that in the example of the wand the segments of each three elements are identical as they share the same color definition.

According to the center of the segments, each of these pairs defines a vector.

The procedure then calculates the appropriate location of the next elements on the continuation of the vector. If the right color segments are placed in the calculated vicinity then the object is found.

If many elements are required some could be emitted or assumed.

The procedure searches for a series of elements listed under one of the sides of the object according to the center of the segments and the assumed projection of the center of the elements.

i. Color Seek (5009)

Produces a corrected list of elements where the color constraints of the elements are corrected.

This procedure is not executed unless required by the location process.

If the correction step was performed and the object fitting was significantly improved, then a color seek is required to add a slight correction to the color constraints. These corrections not kept after losing the object for a certain period of time, when switching objects or when restarting application.

The corrections compensate on lighting conditions, such as intensity of light or the type of light source (sun, lamps, florescence, etc.).

i. Color Correction (5009)

This procedure is performed only when required. This step corrects the color constraints of the object when required (9001), (9003).

The correction procedure does not work for elements with patterns engraved on them (9002), (9004).

Figure 9:
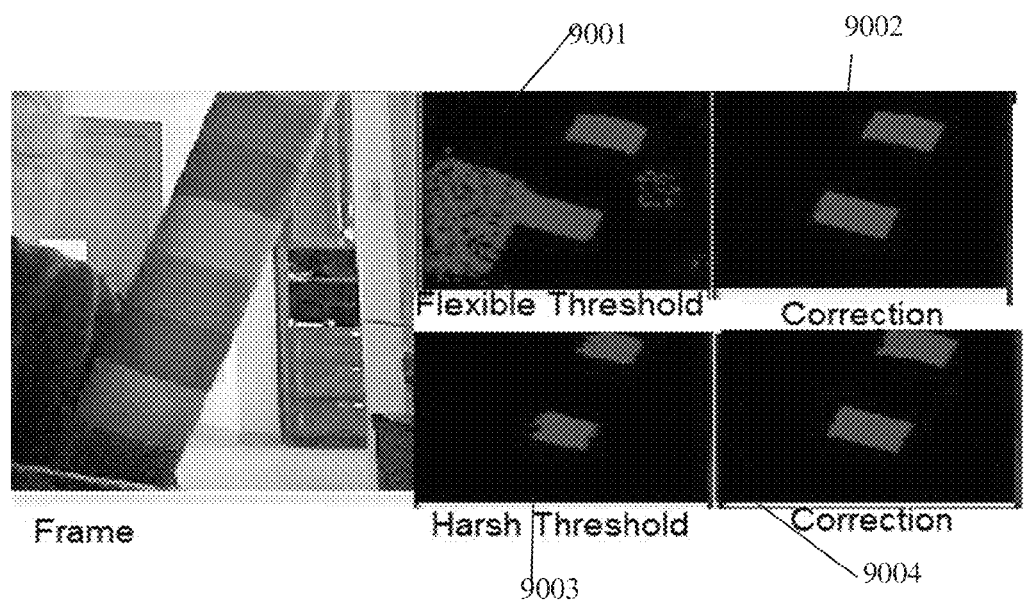
FIG. 9 is a perspective view of the Color correcting stage of the object identification method according to an embodiment of the invention.

The function of the correction is to identify the proper edge of the segments that were chosen, as shown in FIG. 9. This is done by sifting through the pixels from the center of the segment, outwards, and stopping at an edge, the edge is defined when the color deviates above a certain fixed constant.

Most elements are identified by color, when the element is characterized with a color constraint it builds segments of points in the frame that correspond to the constraint.

If the constraints are too harsh, patches of the element might not be included in the segment due to shading, light reflection or deferent lighting types.

If the constraints are too feeble, the segment of the element might include background patches of close colors.

The identification manager will call upon the correction from two points:

If a shape feature is added to the color feature of the element, but the match is bad.

After identifying the object and fitting the elements, a certain element is shifted or not in the right size, than expected from the other elements.

i. Mask (5010)

Figure 10:
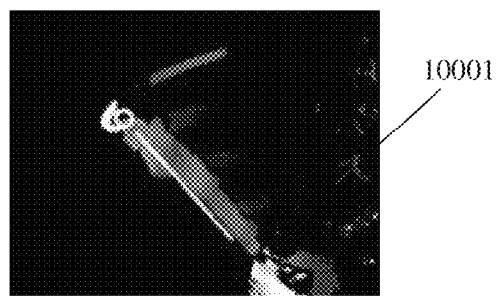
FIG. 10 is a perspective view of eliminating the area around an identified static object in the background update stage of the object identification method according to an embodiment of the invention.

Before analyzing the image the background was removed from the image. To insure that the object itself is not harmed in this process, the area where the object was identified on the previous frame is masked, as seen in FIG. 10, so that the object will not disappear gradually when the object is static.

i. Tracking Fast Movements of the Object (5007)

If the object is on screen but the user waves it around while the camera is capturing, then the image of the object will blur or completely disappear. Elements on the object that emit light will leave an imprint on the captured image. These segments are also chosen in the segmentation stage and their shape is analyzed to define an appropriate track. If a suitable segment is chosen, the track is accepted as the tracing of the objects movement.

Figure 11:
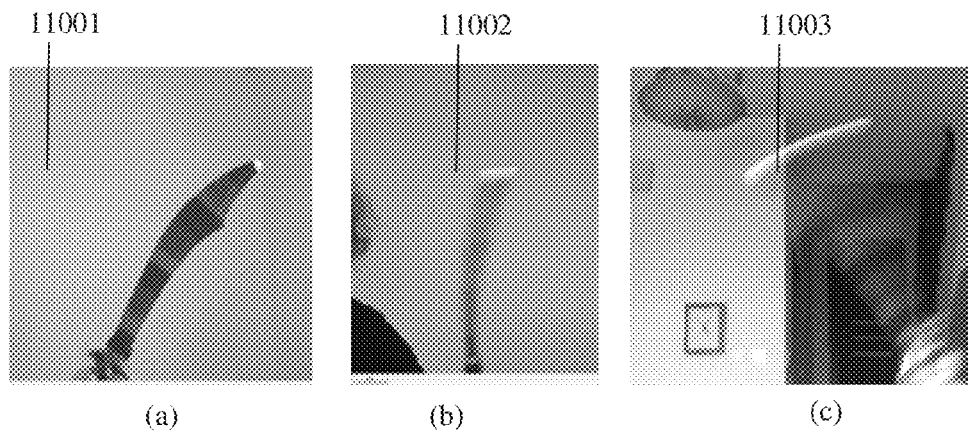
FIG. 11 shows the need to combine static and dynamic identification methods according to an embodiment of the invention.

In FIG. 11 an object is static (11001) and all its elements are distinct, The elements can still be identified in slow movements (11002) but in fast movements (11003) the colored elements blur or disappear but the light emitting element leaves a definite path.

The identification of a moving light emitting object is implemented in parallel to the static object identification and the two methods complete each other.

The segments defining the trail of the LED are presented in the frame as high value with low saturation.

Figure 12:
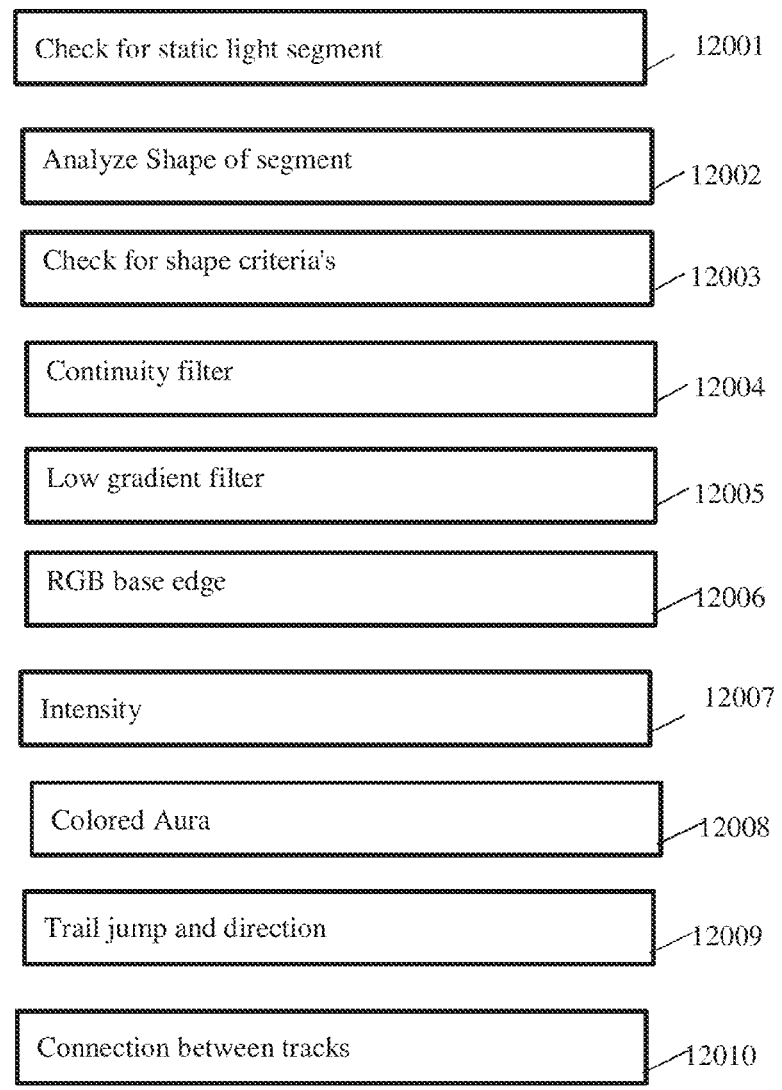
FIG. 12 shows the flow chart done on each bright segment to identify the segment produced by the light emitting marker according to an embodiment of the invention.

After all segments that can possibly be the desired object are found, each segment is tested according to flow chart FIG. 12.

For each segment that might be the Led trail, the following characteristics are checked, each step either filters out the segment or gives the segment a rating, eventually the best segment, if any, is chosen.

First each segment is checked (12001) to be in a static mode.

Figure 15:
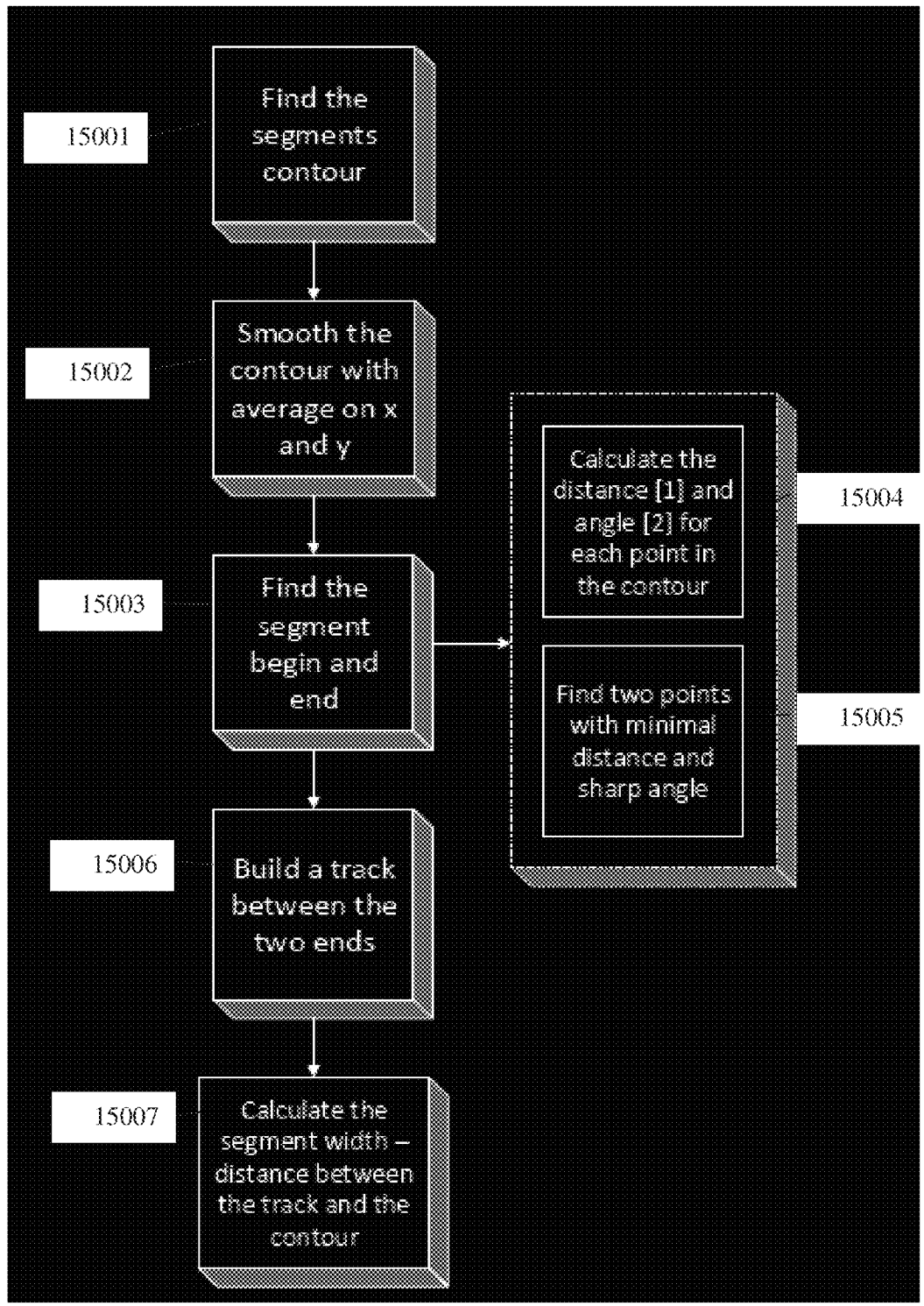
FIG. 15 is a flow chart of the process of identifying the shape of each bright segment in the object identification method according to an embodiment of the invention.

Then a shape analysis is built for each segment in search for a bent narrow trail (12002), FIG. 15 shows the flowchart of the process for shaping the segment.

The shapes are tested to see if they are close enough to the criteria's of the desired object (12003).

Additional filters are used to avoid choosing the wrong segment:

Continuity filter (12004)
Low gradient filter (12005)
RGB based edge (12006)
Intensity (12007)
Colored aura (12008).

Calculating the distance of the shape track from the track in the previous frame and resolving the direction the object traveled in the current track (12009)

Finding possible tracks to connect to the chosen track

If two segments are chosen that are close enough to each other a connection algorithm combines them together (12010).

Eventually the points from all the tracks and connection are sent out as emulated signals of the mouse and touch pad.

For the output deferent settings are acquired to define if and when a mouse button action should be emulated and when. Also, the output should be balanced along the time of the frame so that the movement is presented consecutively and not in pulses.

i. Dot Segments

When the object is not moving fast the image, of a single frame, captures the required element (the tip of the sword) as a full small circle of pixels that past the segmentation criteria: has a high brightness value and is smaller than a certain expected radius.

Figure 13:
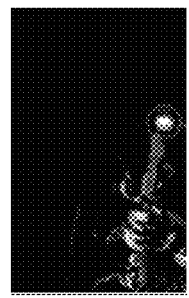
FIG. 13 is a perspective view of a segment created by a Static Light emitting marker, in the object identification method according to an embodiment of the invention.

In FIG. 13 we see a segment that is round enough and small enough to pass as a "point" rather than a track. The average distance of all the edge points of the segment to the center give the indication of the circles radius and the accuracy is calculated from the deviation of these distances.

The expected width of the circle is wider than the expected width of a line or curve received when moving the object, and that is taken into consideration.

The distance of the object from the camera is related to the expected width, when the sword edge is too close to the camera, the segment will be too large and the input will not be accepted. When the object is too far from the camera, the segment will be too small to identify.

The distance in which the object is identified is between 0.5-2.5 meters.

i. Shape Segments

Figure 14:
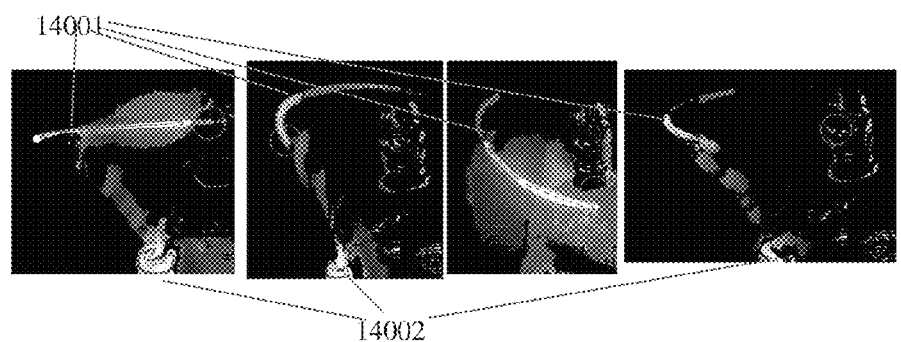
FIG. 14 is a perspective view of the Shape identification stage of a light eliminating Marker segment according to an embodiment of the invention.

When the object is moving various shapes are created by the objects light element (the sword lit edge). Most are curves. In FIG. 14 a variety of common shapes are displayed. Some represent the lighting element (14001) and some need to be filtered as background (14002).

Following is the detail of the process to extract the shape and track of all the segments: A Contour is built around each segment (15001). The contour is smoothed to avoid faulty edges (15002). To find the main ends of the shape (15003): the contour angle is calculated around each point of the contour (15004) and the points at which the contour bends the most are chosen (15005).

A track is then built between these two ends by following the points of minimum distance from the contours on both sides (15006). A main indication, the average distance along the track from the contour is calculated to define how "snake-like" the shape is (15007).

i. Contour

Find the outwards contour of the shape. Inner holes do not concern us, only a list of the outside perimeter of the segment. The contour is built by following the outward skirts of the shape in a clockwise manner.

The contour is then smoothed to skip minor deviations in the direction.

Figure 16:
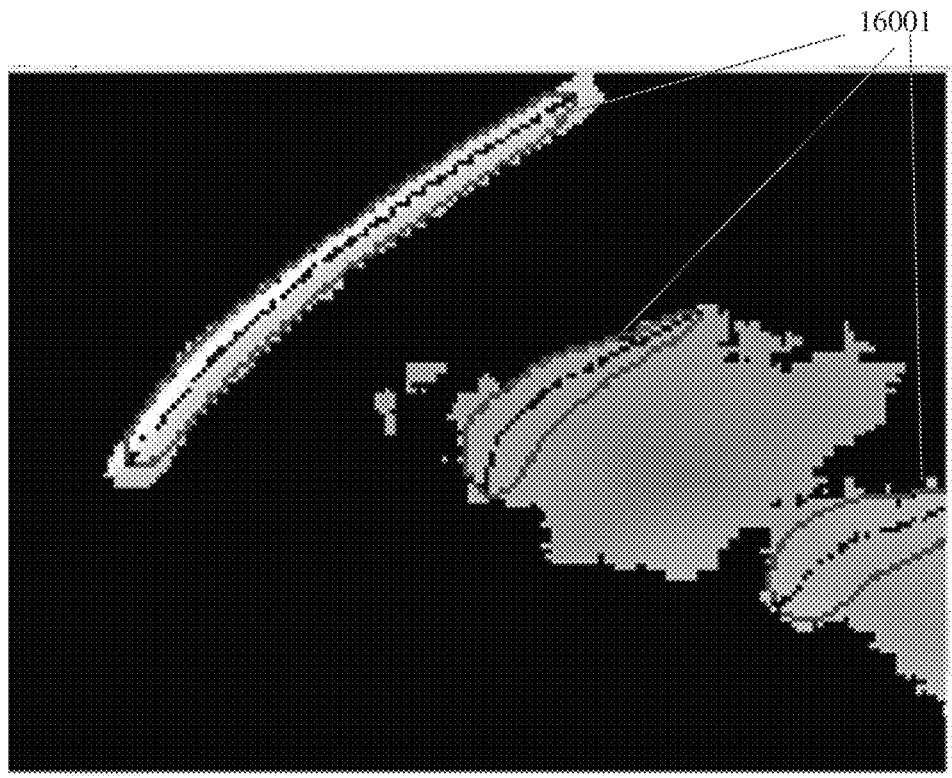
FIG. 16 is a perspective view of Contour building of segments stage of the object identification method according to an embodiment of the invention.

In FIG. 16 the blue line around the segment (16001) is the smoothed contour.

i. Track Edges

If the segment is a trail of light around a track that the element has passed during the current frame, then we must first define where this track begins or ends.

Figure 17:
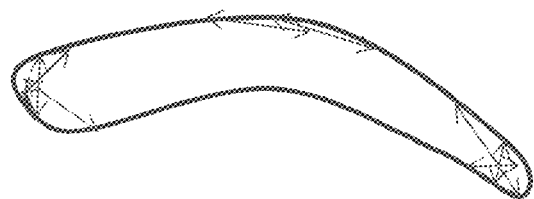
FIG. 17 is a perspective view of the segment shape corners detection in the object identification method according to an embodiment of the invention.

Running along the list of points of the contour, a new list is created that calculates the distance between each two points of the contour at a fix index between them (FIG. 17):

$$\text{Dist}_i = \text{Dist\_Func}(\text{Contour}_{i+step}, \text{Contour}_{i-step})$$

Where each contour element is an x, y point.
The Dist_func is:

$$\text{Dist}_{func(p1,p2)} = \sqrt{(p2_x - p1_x)^2 + (p2_y - p1_y)^2}$$

And step is a set parameter for most shapes but smaller for segments under a certain size, so that the edges do not combine.

Figure 18:
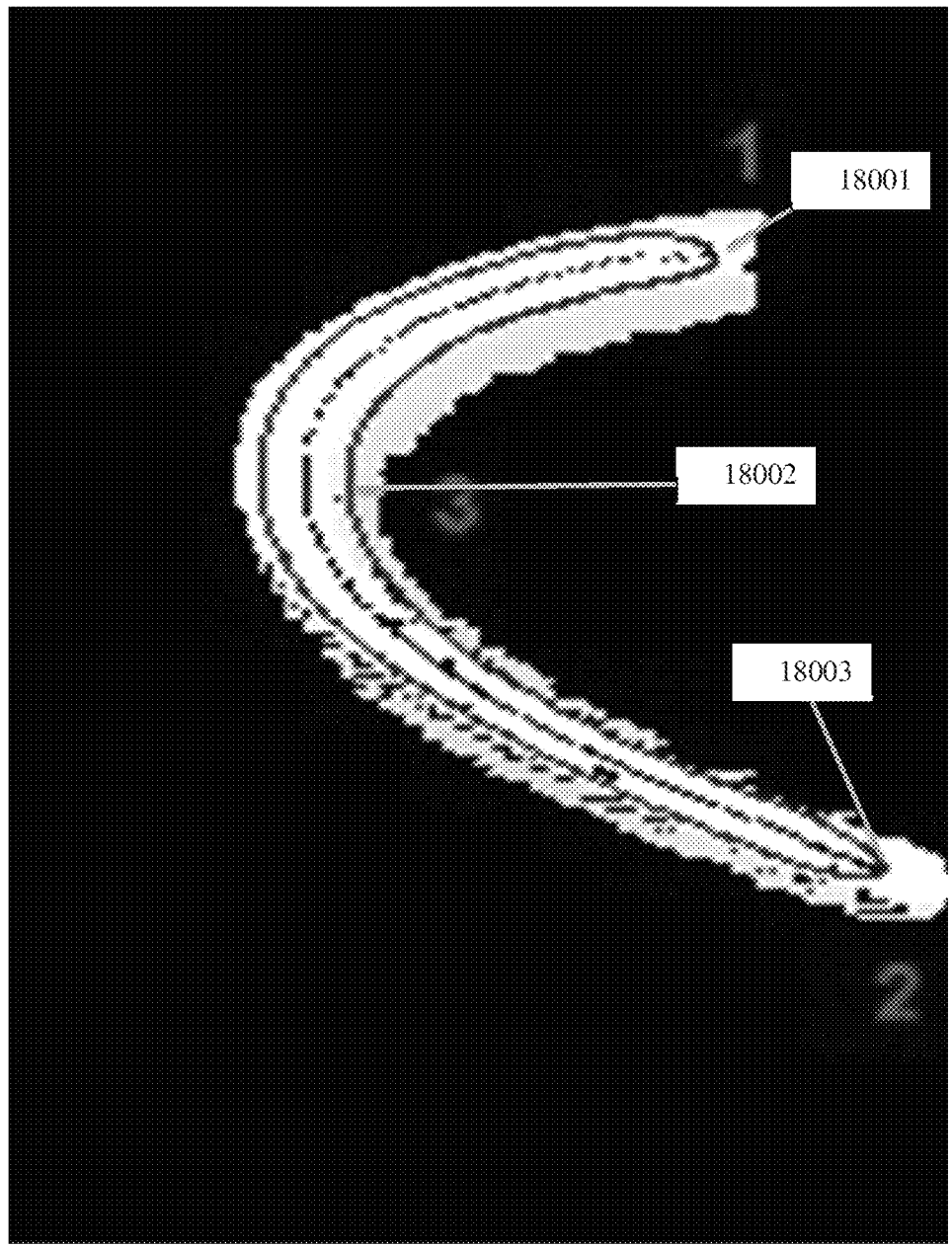
FIG. 18 is a perspective view of segment shape sharpest corner selection stage of the object identification method according to an embodiment of the invention.

The next step is finding the local minimum distances along Dist, these points indicate a turn in the contour (FIG. 18).

An inner angle of the segment is calculated for each point in the contour.

A number of edges are found (18001-18003) according to the minimum values in the distance list, edges are found only when corresponding to angles smaller than 180 degrees.

Tracks are defined (as explained later) between each pair. The longest Track is then chosen.

i. Building Track

A track is built between a pairs of track edges. The process moves along the contour list from the point of the first "track edge" in both directions. The process advances a fix amount of points on one side and then scans the other side to find the minimum distance between the points. This continues towards the other "track edge".

Figure 19:
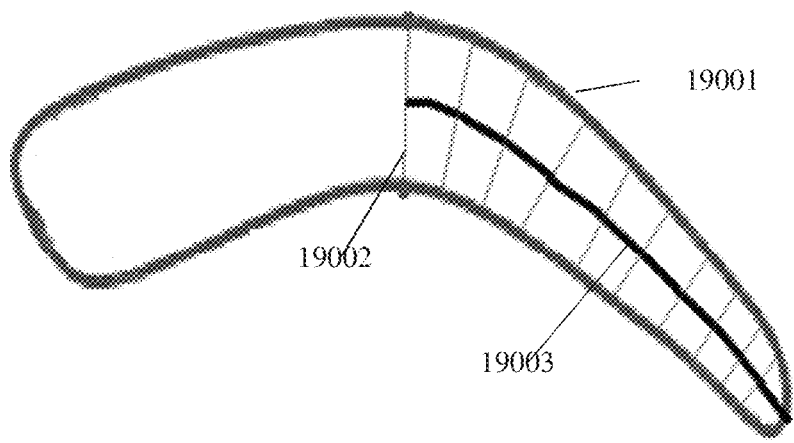
FIG. 19 is a perspective view of the segment shape track building stage of the object identification method according to an embodiment of the invention.

When one of the proceeding points is close to the second edge the step is shortened to achieve a more accurate track as seen in FIG. 19, where the contour is the blue line (19001) the minimum distances are the red lines (19002) and the track is the black line (19003).

The longest track is then defined as the resulting track of the segment.

i. Segment Width

Calculating the width of the segment along the track provides the system with the best way to rate the segments probability of being a result of a light trail.

This is done by calculating the average of the minimum widths that built the track in the previous step (FIG. 19), the red lines (19002).

This indicates how close the segment is to a snake-like shape around the chosen track.

$$\text{Width} = \frac{\sum_{track} \| P_{Ti} - P_{Ci} \|}{\#\text{dots in track}}$$

$P_{Ti}$—point in the track
$P_{Ci}$—the closest point in the contour to $P_{Ti}$ i. Continuity Filter If this filter is requested and in the previous frame a track was found, then the current track is expected to start at the vicinity of the end of the last track.

The radius in which the next segment is expected to begin and the penalty the segment receives if it is not in the expected area are parameters of the setting file, indicating the importance or severity of a track 'jump'.

Figure 20:
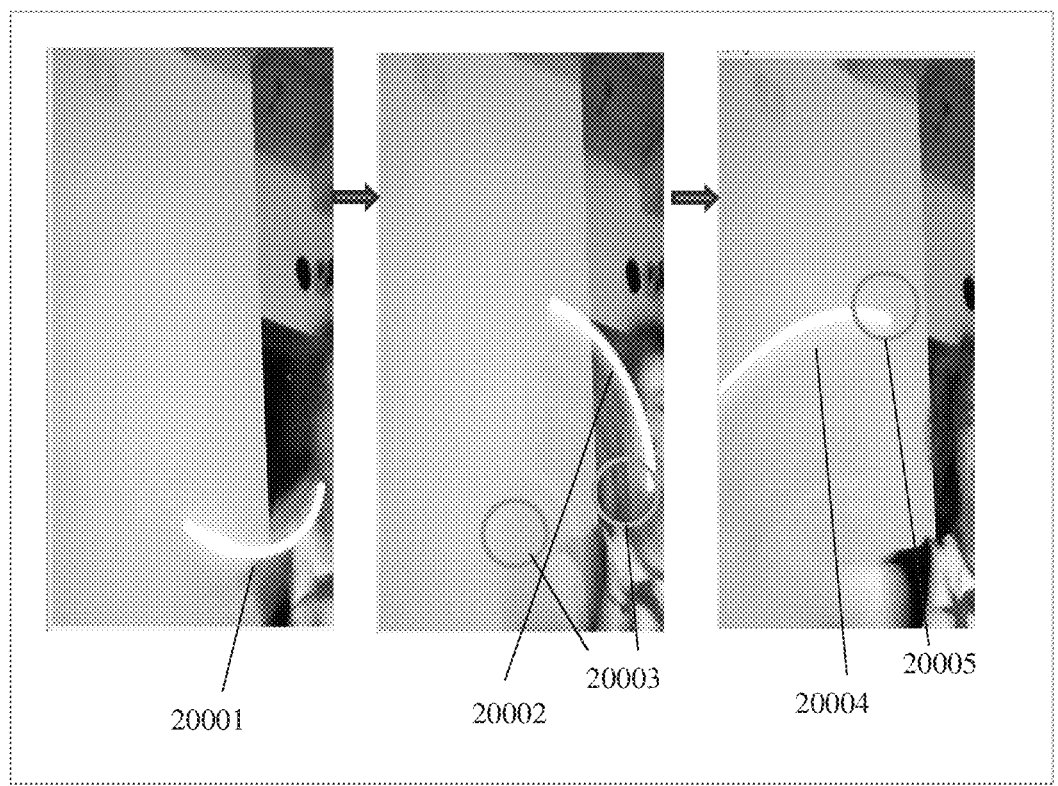
FIG. 20 is a perspective view of the continuity check between tracks of segment shapes of the object identification method according to an embodiment of the invention.

In Fig. 20 we see the current segment and the green circle indicates where the last segment finished.

In (20001) if no segment was identified before, the track can be in motion from left to right or opposite direction. In the next frame we expect the track to begin in either areas (20003), the track end is in one of the areas and so it connects and the other end is the point where the object finished its trail (20005) and the net track will be expected. If a track ends at either edges of the screen, the next few frames will expect a segment to begin at the same side.

This serves also to calculate weather the current segment is far away from the previous findings or "on track".

This indication also allows the program to figure which of the segments ends is the beginning and which is the end, so that a proper flow of indexes will be executed.

i. Low Gradient Filter

Figure 21:
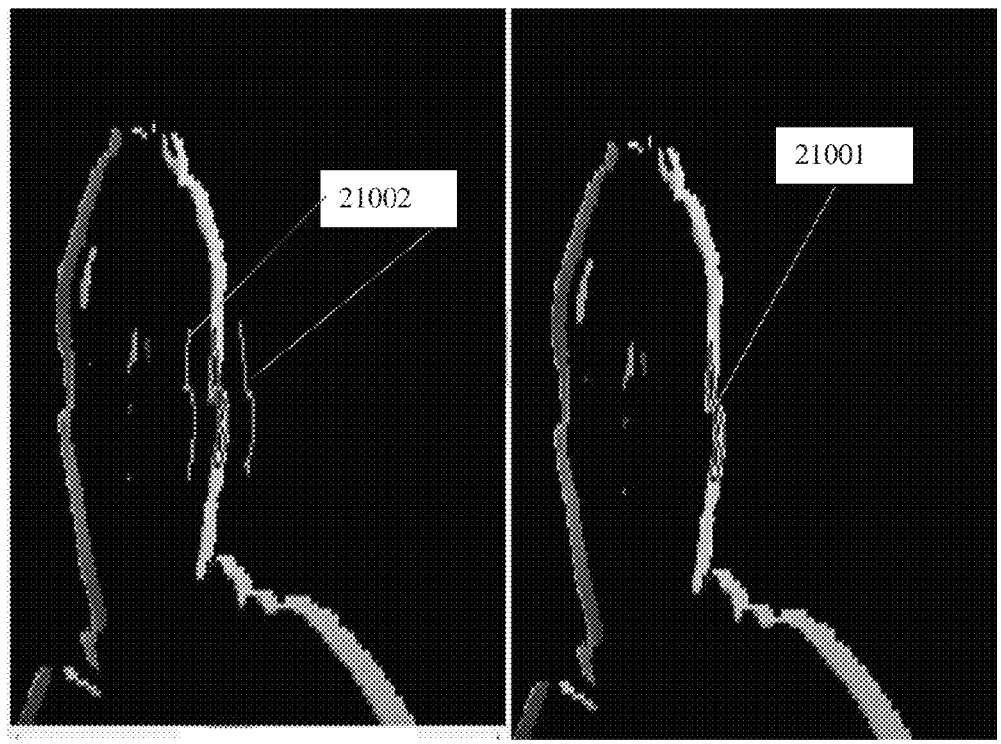
FIG. 21 is a perspective view of the gradient check of a segment of the object identification method according to an embodiment of the invention.

If this filter is chosen, it checks the value of the pixels on both sides of the segments track, beyond the contour. The value must be checked on the original image before the background removal as seen in FIG. 21.

If on at least one side of the track the difference in value is very small, this mostly indicates that the segment is a result of a part of a bright background that was revealed by the moving body of the user or a passing person. In the figure the user moves his head slightly to reveal a bright wall (21001) that is not yet in the background, the segment is thin bright and long to be confused with the Light segment. A line is defined along the contour at a fixed distance, perpendicular to the contour (21002) on both sides of the track. On the left side the difference between the bright wall and the dark face will be high, but on the outer side, the value of the pixels in the segment and on the wall in the origin image are almost the same so this segment will be tagged as a background edge segment and will not be chosen.

i. RGB Based Edge

The RGB based edge is used to define the location where the edge of the sword should be, using the colored elements on the sword. This will only function when the sword is not moving fast, so that the elements can be identified.

Figure 22:
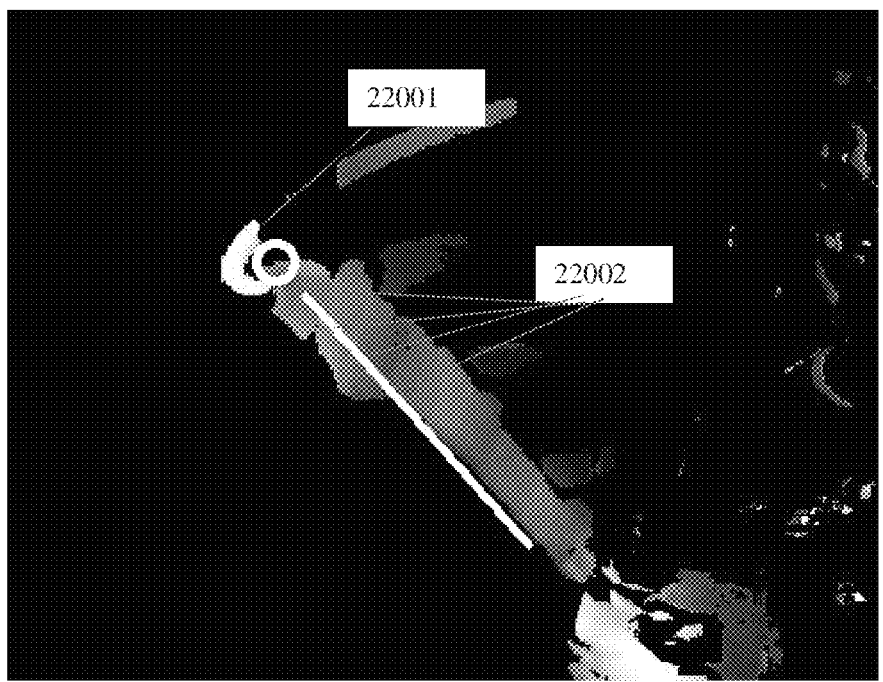
FIG. 22 is a perspective view of the color coding emphasis for a light emitting marker segment of the object identification method according to an embodiment of the invention.

Though the amount of elements aligned in a specific frame was not enough to clearly define the object, a smaller amount of elements can back a specific light segment if it fits the location indicated by the color elements. In FIG. 22 though the information of the elements (22002) was not sufficient, the light-segment (22001) will be chosen as the colored segments back it up. For this feature the segmentation should also produce information on the orientation of the object.

i. Intensity of the Segment

A stronger brightness variable will give the segment a better rating.

While building the segments one of the segments parameters is the average V value of the HSV coordinates of all the pixels in the segment. This will present the average brightness within a certain segment.

Figure 23:
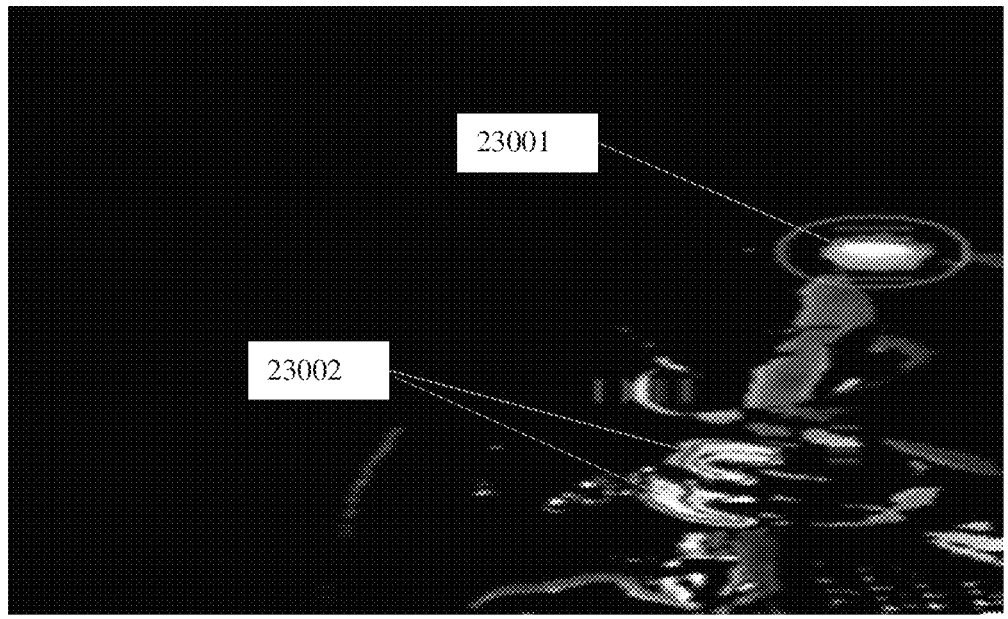
FIG. 23 is a perspective view of the light intensity of light emitting marker segments of the object identification method according to an embodiment of the invention.

If the system detects more than one segment that might be the LED this filter will choose the brighter one. In FIG. 23 the segments created by the hand of the user (23002) are not up to the intensity of the light-segment (23001) itself.

i. Colored Aura Around the Light

Another indication to choose the right segment is that when lighting with a colored LED, the area of the image around the lit segment are also tinted with the color.

Figure 24:
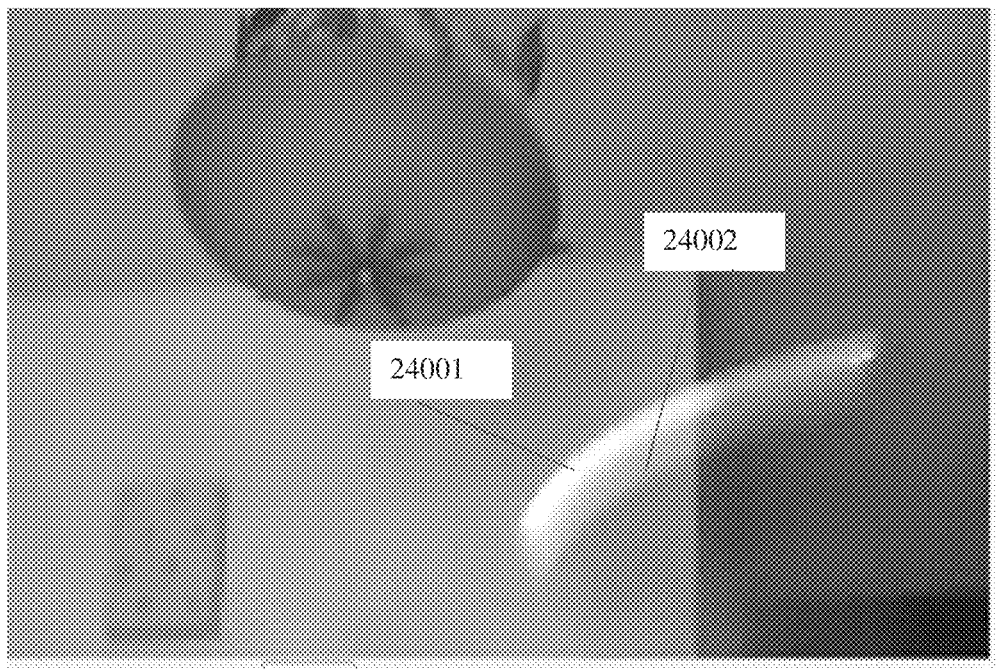
FIG. 24 is a perspective view of the color change around a colored light emitting marker segment of the object identification method according to an embodiment of the invention.

In FIG. 24, the LED passes (24001) a certain track and the area around it, that are not part of the segment, the image is tinted in the lights color (red).

The system scans the original image, before the background was eliminated, and samples the pixels around the contour outside of the segment, in a fixed, external parameter, distance from the segment.

If the background around the segment is mainly red, though of less intensity, the segment gets a higher rating.

i. Order of Track

Between each track, of each frame, there is usually a small distance. This distance can be jumped by simply giving the location of the next track immediately after the first, Otherwise a Spline algorithm is defined to work as a smooth connection between the tracks.

After the segment is chosen and its track is defined, the order of the points within the track must be defined. In the frame image there is no indication of the direction of the segment. If the last track was close to the frame edge and for a number of frames no LED was visible, then the next LED will be tracked from the same side of the screen where the previous finding was.

Figure 25:
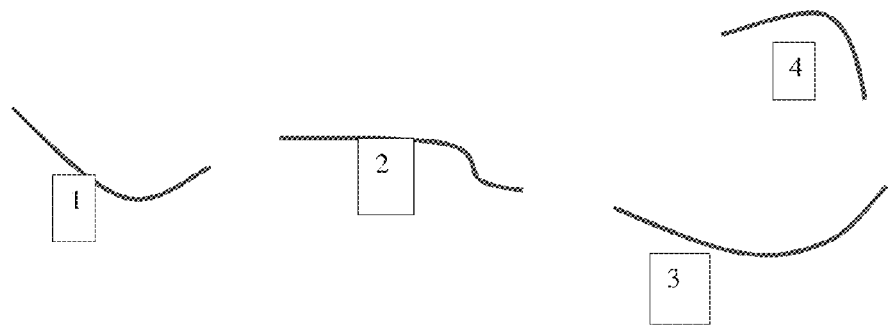
FIG. 25 is a diagram of found tracks in consecutive frames and the continuity method according to an embodiment of the invention.

If a track was found in the previous frame, the track edge closest to the point where the previous track ended is the beginning of the track (if needed: reverse all track points) as seen in FIG. 25.

i. Connecting Between Tracks

There are two types of connection: if a light left a long trail but the segmentation could not identify an area in the middle, we receive to tracks in the same frame that are close and the edges directions blend together. In that case the two tracks are turned into one.

If the chosen light-segments in consecutive frames are not so close then the area between then can be filled by interpolation.

The simplest connection is not doing anything, the cursor just jumps to the beginning of the nest track (which is usually pretty close). A more sophisticated way is to produce an easy spline to connect the tracks without breaking their direction.

Figure 26:
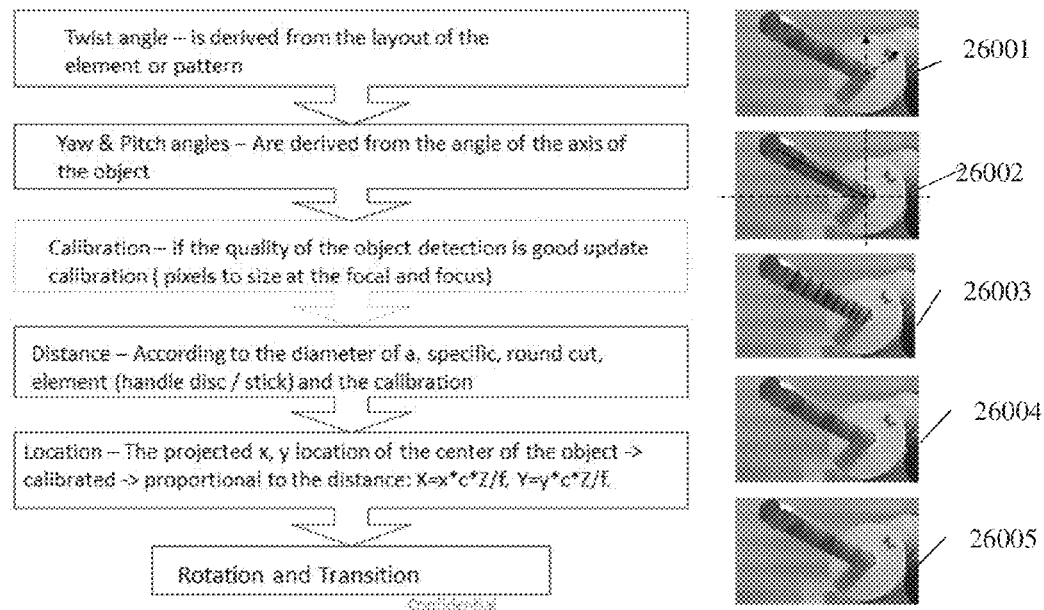
FIG. 26 is a specific location and orientation method for a Wand object according to an embodiment of the invention.

In the FIG. 26, each track ends at a point in a certain direction, and the next track starts in a certain other point in a different direction, a spline line can be calculated for the output to continue smoothly.

i. Buttons

If an object was identified at a side where there are one or more button triggered lights, the element is scanned to identify the state of the light. Sometimes the area around the LED is in saturation, if so, the rim of the saturated light will indicate the color of the light.

a. Frequency Encoding.

Light emitting markers can flash in a steady frequency to assure proper identification. A frequency higher than the camera capturing frequency will assist in identifying the trail of the LED while in motion. When in movement the trail will appear as a dashed line indicating the speed of movement.

Low frequency flashing, under the frequency of the camera acquisition, will help to identify the light emitting marker when the object is static. The frequency of identification of similar segments in the same area will be a valuable assurance of identification of the object.

Object Location and Orientation Module

For the identified side of the object there are n identifiable elements

From the 'Object Description' file we retrieve for each of the elements the coordinates of the center of the element in relation to the object axis.

$M_o$ is a matrix of n element coordinates in relation to the object axis.

Based on the projected location of each element in the 2D image frame:

P is a matrix for all n projections.

M is a matrix of the elements in camera coordinates.

using the rotation matrix R the translation vector T:

$$M_o = \{R|T\}M$$

Base on the projection operator C that projects from the real 3D word into the image frame:

$$P = CM_o$$

A set of n equations are built.

If some of the elements are of a round nature the diameter of the elements can provide information on the distance of the element after calibration.

Work with rounded elements can be seen in FIG. 9 where all elements are cylinders.

In FIG. 26 a wand object was identified, the twisting angle of the object (26001) is derived by the layout of the elements, the 'W' sign on the disc is an element. The angle of the object around the objects axis is defined by the displacement of this element.

The tilt and turn of the element (26002) are the angle between the axis of the object to the horizontal and vertical planes of the camera axis, these are also extracted from the rotation matrix.

Calibration of the camera parameters, if needed, is done when a definite and clear identification was achieved (26003).

The transformation vector provides the distance and shift of the object from the cameras axis, in space (26004).

If the user is working in front of a display screen a further shift should be made to calibrate between the center of screen to center of camera.

This needs interaction with the user, asking to point the object at the center of the screen, or trying to shoot some shots to a point on the screen, then the calibration can compensate on the distance between camera and display.

If the camera is a 3D camera, depth parameters can be added to the points on the screen where the object has be identified, Then calculation of Location and orientation in space will be based on the depth information combined with the location found on the projected image.

Output Manager Module

After identifying and locating the object, the location, orientation and light results are transferred to the output manager module.

The method translates the parameters according to the current emulation settings file (27000).

The translation is part of the 'Output Manager' module.

Figure 27:
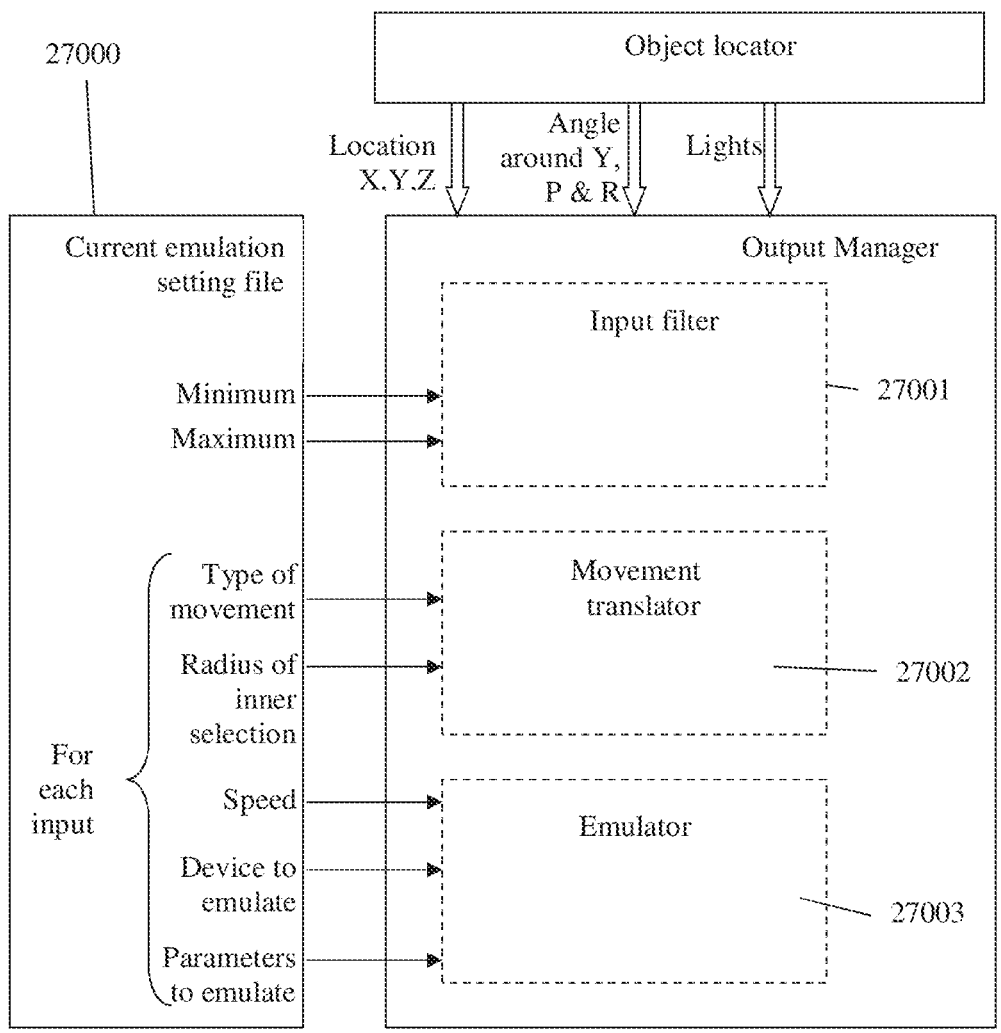
FIG. 27 is a schematic block diagram of the output manager according to an embodiment of the invention.

The 'Output Manager' module is shown in FIG. 27.

i. Output Manager—Input filter (27001)

Data is extracted only when significant changes in parameters will take place.

In the Output settings file, the minimum and maximum speed parameters define when to ignore the objects movement.

Maximum speed: As the objects cannot stay in midair, the controlling object must quickly be brought into range, or extracted quickly from the field of view, so that it doesn't enter false movements. The maximum speed will define the biggest allowed difference between two frames. Any movement exceeding this difference is ignored.

Minimum speed: Defines what minimum difference in location qualifies for a change in parameters. If the object is held by a shaking hand, the Method must ignore these little changes rather than invoking interrupts continuously though the object isn't going anywhere.

The difference in location or angle is calculated in respect to the parameters of the previously invokes interrupt, thus avoiding shakes but accepting drift.

i. Output Manager—Movement Translator (27002)

Figure 28:
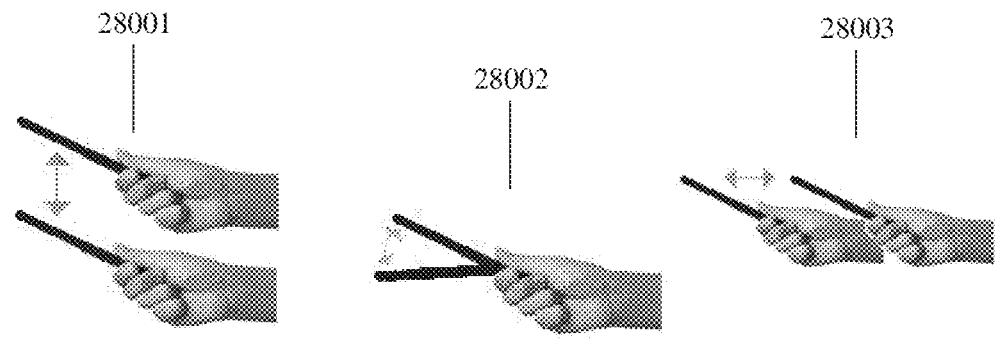
FIG. 28 is an illustration of the object position and angular movement according to an embodiment of the invention.

Navigating can be performed by moving the object left/right, up/down (28001) and in/out (28003) (FIG. 28). This is represented by the Location parameters: X, Y and Z.

This data is the real offset of the center of the object from the camera: X & Y are the distance in cm of the center of the object from the focal axis of the camera. Z is the distance of the center of the object, projected onto the Z axis, in cm.

When emulating 2D standard input devices, there is no translation for an absolute Z indication. The X and Y should be transformed as if they are projected onto the plain of the screen:

The object is in space and can be viewed in a cone-like area, in front of the camera, this is the area of the cameras FOV.

When moving with the object, up/down and left/right the cursor moves on screen. If the object is closer to the camera the movement is small, if we move away the object moves much more to complete the same movement of the cursor on screen. For translating the location for 2D devices the X and Y should be translated to their projection on the screen plain: Xp, Yp. Moving the object forwards and backwards, the Z difference, is used as an in/out like the wheel on the mouse.

Navigating can also be performed by tilting the object left/right, up/down or by twisting the object (28002).

These parameters are in respect to holding the object upright.

The transformed axis will now originate at the center of the object.

The Yaw is the angle of tilt around the Y axis, $Y_r$, i.e. tilting the object left and right.

The Pitch is the angle of tilt around the X axis, $X_r$, i.e. tilting the object up and down.

The Roll is the angle around the Z axis, $Z_r$, i.e. twisting.

These are the six degrees of movement. The translation level of the system, receives these parameters, calculated from the object location, and categorized as Angular and location parameter.

Each of the above location parameters is then translated according to a suitable movement method: Absolute, relative, speed and mix.

Absolute location: The location of the object projection is proportional to the location of the cursor on screen. The Z location is passed as real.

Relative location: The change in location is proportional to the change in the cursor location.

Speed location: The distance from the center indicates what direction and speed the cursor should move. For movement on the Z axis the center is set by a parameter from the emulation settings file.

Absolute angle: The angle of the object is proportional to the location of the cursor on screen. Just like pointing to the screen.

Relative angle: The change in tilt is proportional to the change in the cursor location.

Speed angle: The angle indicates what direction and speed the cursor should move.

Figure 29:
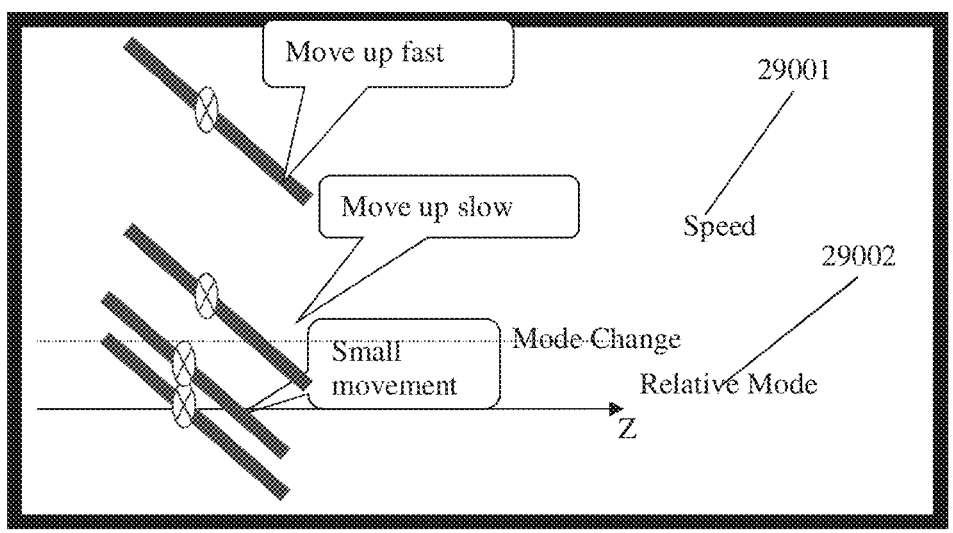
FIG. 29 is a view of mixed mode of movement Output manager according to an embodiment of the invention.

The mix method combines the relative method with the speed method, the emulation settings provides a radius (As seen on FIG. 29). Any distance or angle inside the radius is translated into relative method (29002), any distance or angle beyond the radius is translated into speed method (29001). This method provides a solution for navigating in fast big steps and then in small exact steps without changing the emulation method.

The mix method is parallel to holding down the arrow key on the keyboard for moving in maximum speed, and then ticking in a few strokes to the left and right to get to an exact position. Or quickly scrolling through with the mouse to the right page, and then moving the mouse in slight strokes to each direction for exact movement.

All the movement types are listed in a table in FIG. 30.

For instance, in a simple game the standard movements (left, right up, down) are not convenient when trying to use the absolute location of the object; it is usually better to use the tilt of the object. This kind of setting, called a Point-walk (walk towards the direction the object is pointing).

i. Emulator (27003)

Any of the movements are translated to any of the standard input devices. Keyboard, touch screen mouse or joystick.

After the movement was translated according to the mode, the output setting file includes information about the device to emulate, the key to emulate and the speed=how fast to push info in to the emulation.

In addition, the movement can also be translated to servo movement or audio as described in table 31.

The movement and triggering of the object can be available (as SDK) for applications to use. In addition, the desired output can be translated immediately to emulate other input devices, such as keyboard, mouse or joystick.

File Manager Module i. Object Description Files

Selecting a Primary Object

Figure 32:
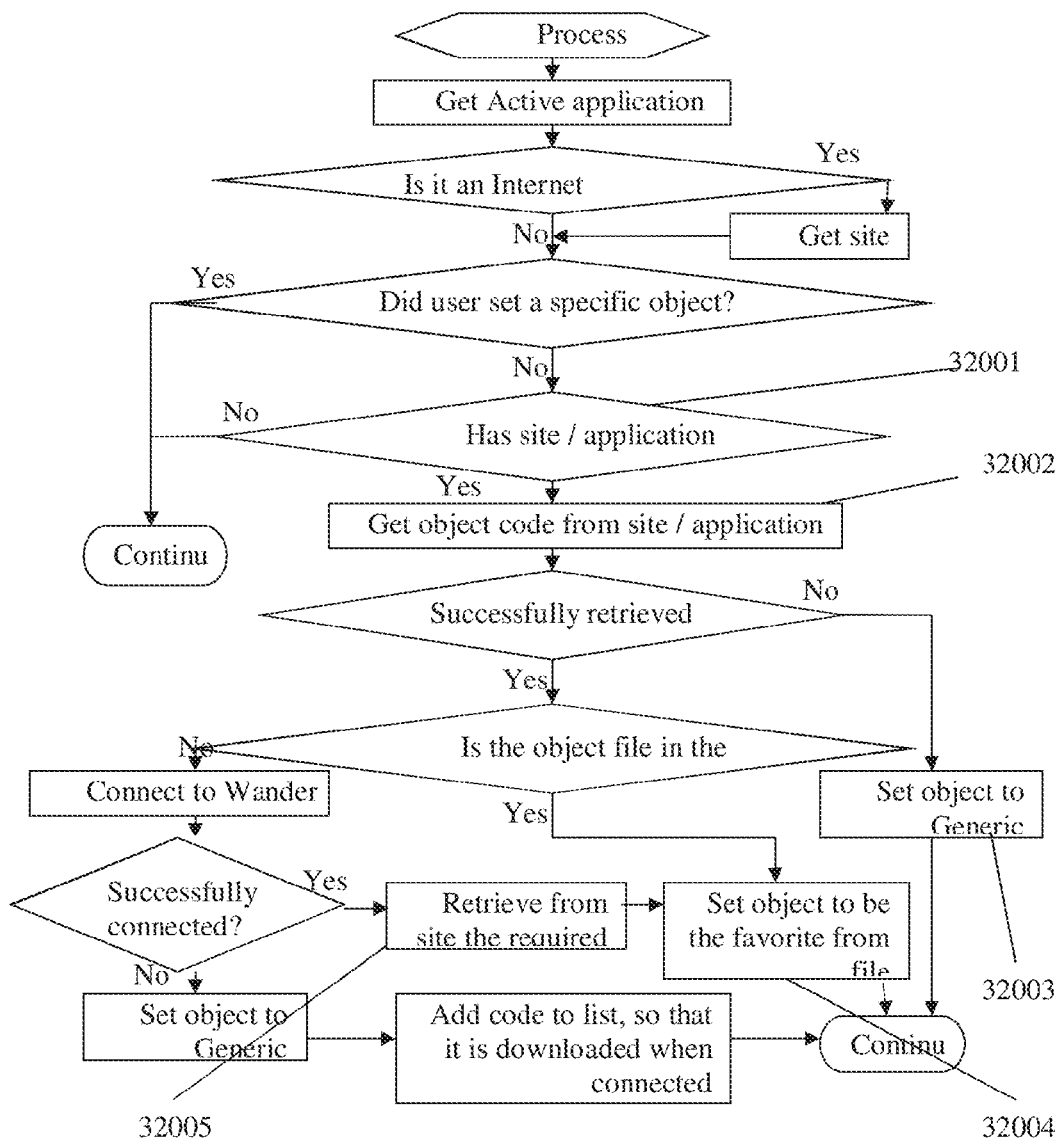
FIG. 32 is a flow chard of the file manager module for finding the right object to identify according to an embodiment of the invention.

When switching to a new site or application, unless the user specifically requests to work with a particular object, the method will automatically search for the required object according to the active site parameters or the LUT as described in FIG. 32.

Switching to the appropriate object and emulation setting, automatically, as the user works on different applications and sites, is a very important feature. It allows the user to use the objects freely, with no preparation or settings required.

The primary object is the recommended object to be used on a certain site or application. In any case all generic objects can still be used.

When the current site or application has changed (32001), if the application has a specific object code (32002), then the object description file from the local database is retrieved (32004). If the file is not on the computer then download it from the home site (32005).

Searching for an Object

When the primary object changes due to an application change or when the current object is not identified for a predetermined time then the search mode is entered.

If a specific object is requested, via "advanced settings", then the driver will search only for the specific object. Even the primary object will not be recognized.

Otherwise the method continuously toggles between a list of known objects until it finds one object.

The list of objects is built according to certain preferences:

First it searches for the primary object selected in the previous chapter.

Then it searches through all the generic objects whose files are listed in the directory. The order in which they are listed is first the generic object that was last used.

i. Emulation Settings

As the user switches between different applications, using one of the objects, the output of the system should be translated differently. Each application requires different input signals. The System is managed in such a way that the user is not required to redefine the signal's translation to cater for each application individually. As the user switches between applications and site, the emulation and translation settings are changed accordingly. A detailed description of this process is described in the next section.

Emulation is the translation of the output of the method to emulate standard input devices, such as the mouse or keyboard. As the product will catch on, many programs on the computer and on the net will use the input of the method as standard input. At present we need to translate the input according to the requirements of each program.

The emulation setting is a file that holds the parameters defining which parameters to use, how to translate them and how to emulate each one. The settings also define the limits of the velocity range of the object; movements exceeding the range will be ignored.

The system holds a small database that pairs applications to emulating settings.

The list, called the Site-Mapping, is continuously updated from the programs site. On the list many popular sites and applications are listed with the keys required to control them. If, for instance, the active application is the desktop, then the absolute location or angle of the object will translate into mouse movements and the light will translate to the left button of the mouse. When entering an editor, a different translation is recommended.

Popular sites and applications are charted and the suitable emulation setting is set when they are activated.

The system has several fixed emulation settings. Each emulation setting file has a code. When a new application or site is chosen the method switches between emulation settings. The setting is either required specifically by the site (33005) or according to the Site-Mapping list.

The programs-site will allow any internet site to choose an appropriate movement behavior that fits the application. The home-site will provide internet site builder, or an application designer with a code representing emulation setting that is required for each page or net application. This parameter will not disturb or change anything in the site, but will enable the method to operate properly in the site.

Figure 33:
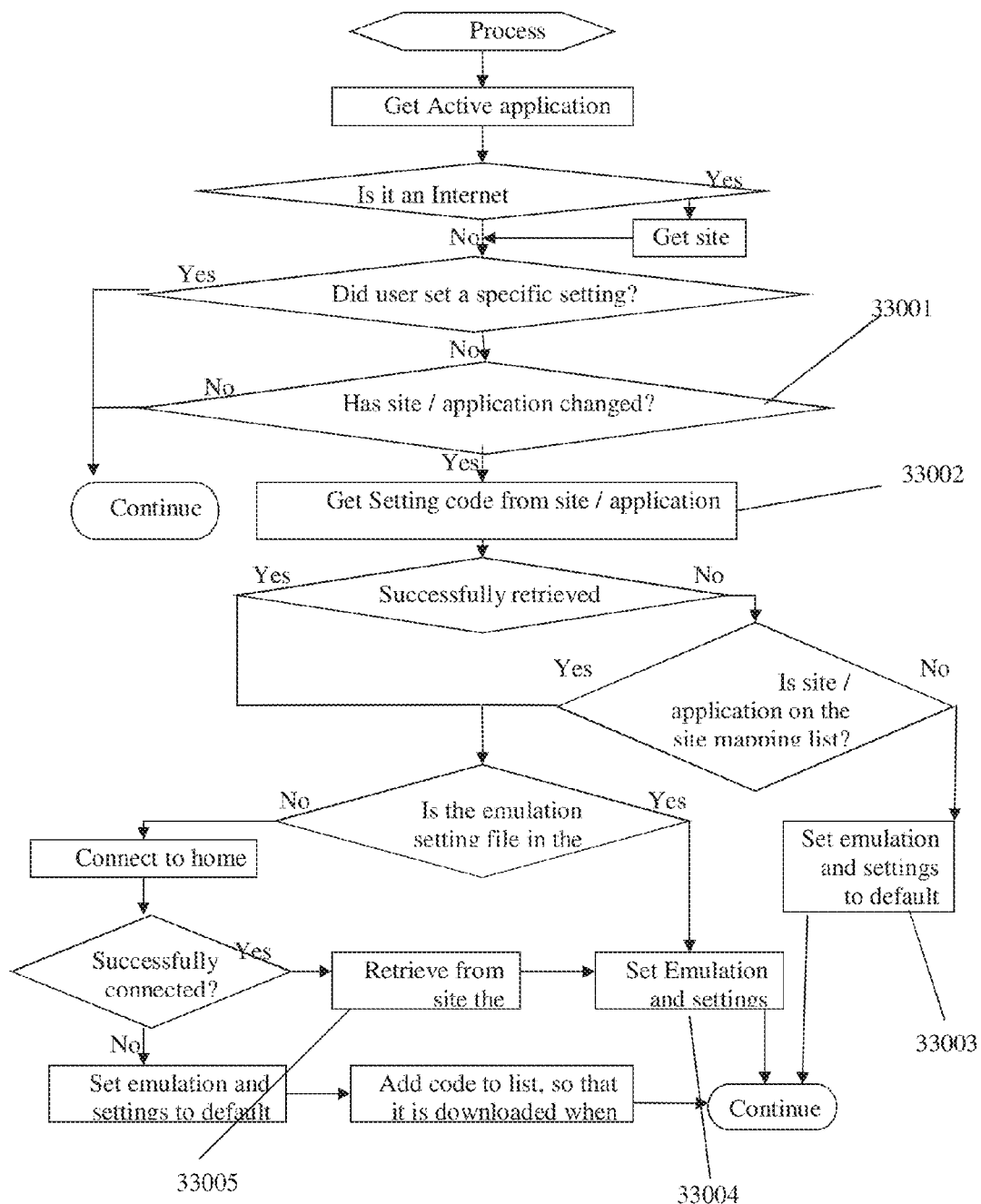
FIG. 33 is a flow chard of the file manager module for finding the right output settings according to an embodiment of the invention.

FIG. 33 shows the flow chart of 'output setting' selection and management.

The method continuously checks for the active application (33001): if it is an internet application it checks the site and acquires the settings accordingly. If a site has a setting code the proper setting file will be used from the local data list of settings (33004), if the specified file is not in the local list it will be downloaded from the site (33005) according to the setting code.

If no specific setting is found, the system will operate on a default setting (33003).

This is described in FIG. 33 as a flow chart.

i. Adding an Object or Emulation-Settings File

To add a definition of an object requires only placing a small XML file to the object's directory, even while the application is running, and the object that was defined will immediately be recognized.

If the application is not installed on the computer, the application on the server or embedded in another application holds the object definition without referencing the computer or saving on it.

One way is to download the object definition from a file and place it in the right directory.

Another way to acquire new defined object descriptions is by "learning" a new object by running an application that contains a code of an object that is not in the list, or when passing through a site that refers to the parameters. Then the device polls onto the application or site to retrieve the new description and adds it to the folder automatically.

Every xml description form will have a special code legalizing it, so that the system does not accept malicious files or forged objects.

Another safer way is by getting the code of a new object, and automatically downloading it from the site.

Predefined Object i. Initializing New Objects

This is a separate code and system designed to analyze a new object and produce a structure describing the object to serve the program.

The final structure is held in an XML file.

The 'user' here is a third party company wishing to apply their own product into the system.

The object is placed into a transparent box, held firmly, tilted and flipped by the program and scanned by a calibrated camera and a distance probe.

The object is seen on the screen and analyzed directly. The application sets a default set of axis and the user can change it to set the required axis of the object. Moving the origin of the axis (object center) will change the location parameter or each element, tilting the axis will require the application to build a new set of elements according to the new relative angle.

When an axis is set, the application calculates the elements at each side.

The specification required from the object is to have a few definable elements on at least one side. An object with only one identifiable element per side can be used but its quality is low and the program will require a calibration to measure the distance.

An element is definable if it has a surface of a specific color and shape pointed at one of the object sides, or completely rounded at one or both axis of the surface.

An object structure contains a list of identifiable elements viewed on each side of the object.

According to the defined axis, each side is compared to similar pictures with slight tilt. If the surface is flat and perpendicular, the area will shrink when tilted to any of the four sides, if the surface is a ball, the size will stay constant when tilted to either side. A cylinder will stay constant when tilted around the main axis of the cylinder and shrink when tilted on the other axis.

All these elements will be listed on the object structure including their depth, shape and color, as well as the side they are projected on and their orientation related to the center of the object as defined by the user who initiates the new object.

The aim of this application is to examine the object, calibrate it with the user's help (setting the axis) and producing an XML file that defines the object.

The application will then register the object in the home site and receive a code number. The registry is a critical step, the method will not accept an XML file that is not registered in order to avoid corrupted files that could harm the efficiency of the device.

Following is a list of objects that can be used

Figure 34:
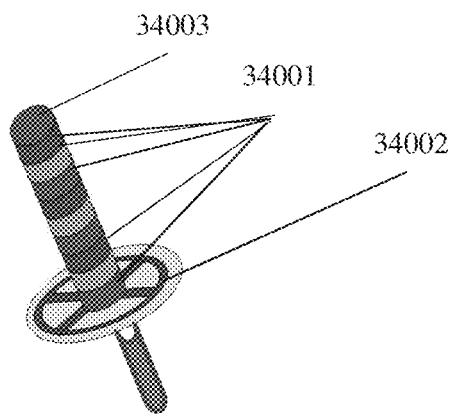
FIG. 34 is an example for an object The wand according to an embodiment of the invention.
Figure 35:
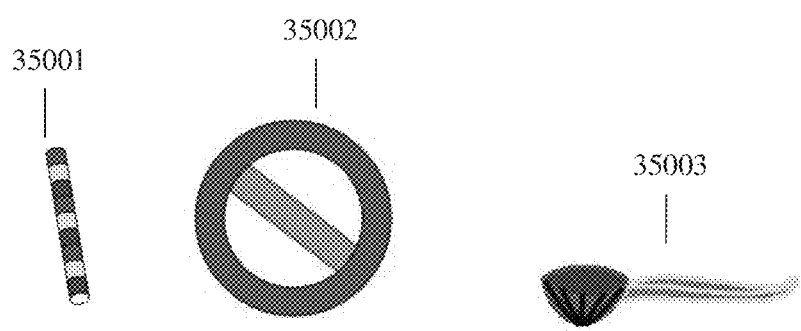
FIG. 35 Are examples for objects—pen, wheel and spoon according to an embodiment of the invention.

Wand (FIG. 34)

The Object is a cylinder.

It is constructed from 9 elements of similar size (34001).

The diameter of the cylinder is 3 cm.

The length of each element is 2 cm.

The elements are colored in three defined colors and are laid out alternatively, blue, green and red, from top to bottom.

A big yellow disc (34002) is placed perpendicular to the cylinder, between the handle and the colored elements. The yellow disk has a blue circle and cross on it.

At the tip of the 'wand' there is a red, semi-transparent cylinder with a light inside (34003).

The stick extends on the other side of the disc to perform a 'hilt', to easily hold onto the object. At the hilt a small push button is placed that lights the light at the tip of the stick.

The stick, with the alternating colors, is easy to identify when the wand is held perpendicular to the camera axis.

As the 'wand' tilts towards the camera the stick slowly disappears and the disc will help to identify the object and its position.

The user is supposed to hold the object by the hilt.

The 'wand' is identifiable in all directions but the bottom side, the top is identifiable as long as the circle is in the FOV of the camera, all sides are identifiable as long as at least five middle elements of the stick are in the FOV of the camera and all sides are not identifiable if the light is out of camera range.

So the 'wand' is free to 'Wander' in all the field of view of the camera and in all angles that face the camera.

The combination of the stick and handle is the best 3D object to use a 3D input device and set is the initial default object on every application.

Pen (35001)

This object is similar to the wand only smaller and without the disc, and of different colors.

This object is held closer to the camera, hence the resolution and size do not change the calculation and it is similar to the previous object.

Color wise, the colors are now not orthogonal to each other and are not necessarily upon the RGB color axis. For instance yellow, red and purple.

Stirring Wheel (35002)

This wheel is depicted as a round red object with a green line across its diameter.

This can be used for applications that need to rotate sideways, like driving cars.

The user must hold the object towards the screen. If the object is perpendicular to the camera axis, it cannot be recognized.

The program identifies a red ellipse and then the line inside it.

It does not matter whether the wheel is completely parallel to the screen, as long as we can identify the ellipse of its projection.

Furthermore, it does not matter at what angle the green line in the circle is, only the change of the green line direction matters.

It is possible to consider the location of the wheel or angle of the circle for further, more complex, application.

Spoon (35003)

A spoon is a colorful spoon shaped object.

It is a good tool for a toddler to hold and aim carefully for feeding a virtual pet. The pet is on screen the spoon is real and projected into the screen. Practices the young child to carefully hold and aim in different directions, and how to interact between a physical tool and the screen.

Racquet (36001)

A racquet is an object for playing physical games, it is a big object so that the player will stand up and step back rather than sitting and playing.

Any series of sport objects, to get the users to get up and exercise, rather than just dragging a mouse, to develop motor skills.

Spectacles (36002)

These are a pair of spectacle frames without lenses that are fitted on the users face. The frames are constructed of a pair of large bright red and green circles. The circles can be easily identified by the program, thus recognizing the user's face location, distance and angle.

This can be useful for navigation, of maps for instance, when displayed on very big screens: the map or scenery moves and focuses on areas according to head movements.

By sitting in a constant location a user can merely tilt his head to point it at any point on the screen (like a laser pen).

Head location is important to allow the user to feel as if he is looking at a real world through a window=the screen. For 3D effect when viewing the screen from a slightly different angle and location, the picture seen through the screen=window should change accordingly.

Toys (FIG. 37)

Toddlers can use a line of toys, such as trucks (37001) or dolls to be projected into a virtual world on screen (37002).

Accessories can be used, such as a spoon or comb (37003) to take care of their virtual pets (37004).

3D input device as shown (38001)—The user can interact with 3D screens where the display seems as if it is in the room. To interact with the display it is important to have an input device that provides a real location of the user's tool. In this example the users object is a bat and the ball seems to pop out of the screen, as the patent invention provides a real location of the object, this interaction is possible.

Shooting Toys (38002)

3D shooting and pointing toys are used to aim to a specific point on screen. For proper use the shift between the camera and the screen coordinates is critical, this is done using a short aiming exercise for the user before beginning.

Figure 39:
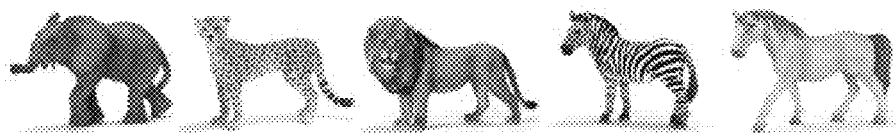
FIG. 39 Implementation of the object identification according to an embodiment of the invention.

Identifying Items (FIG. 39)

A series of 3D figures that the user can point to each of the items in the set with the iPhone camera to identify and interact with.

Specific objects ordered by a 3rd party will not be recognized outside of the application that owns it, and the tool is required for the application, a general object might not be accepted.

Multi Objects

The technology enables to identify to differently coded objects in the same frame, enabling two users to hold different swords or other objects and interact, or to use both hands (sword and shield).

Glove

An object used for hand tracking and gesture recognition.

This is a special glove, worn on the hand; each finger is of a different color. The fingers of the glove consist of a solid element, so that the size doesn't vary according to hand-size.

This object slightly differs from the rest as the object is saved as a series of objects; each of these objects consists of 5 elements (Red, Green, Blue, Yellow and Mauve), but each freezes a different hand gesture. The application can recognize the hand and its location, orientation and gesture at changing angles. The hand will be lost if it is not in one of the set gestures but the application keeps searching for all objects=gestures. This enables to use the hand in a very intuitive way, for instance:

Move a flat hand around the desktop, change to a first gesture to choose an option, move a flat hand to a virtual cube, change gesture to a pickup-gesture, move the hand to drag the virtual cube, change to flat-hand-gesture to free the cube.

Features and Colors

Figure 40:
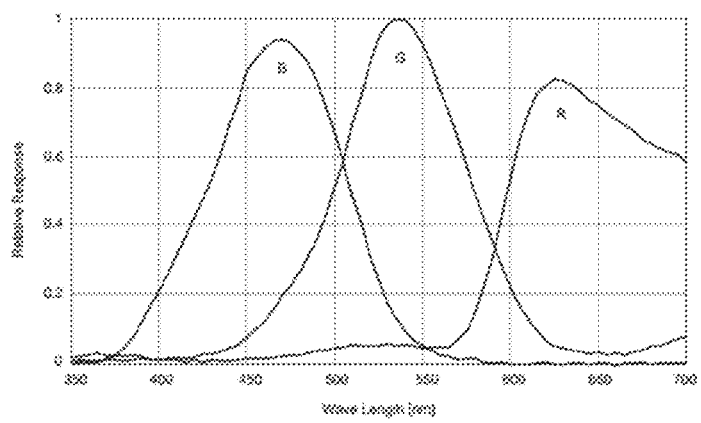
FIG. 40 Color sensors of the camera to receive a narrow band of color according to an embodiment of the invention.

The objects are optically coded as they have certain color definitions at certain locations on the object. The elements on the object can emit (or reflect) light at a certain wavelength range and the 2D camera receives the range (FIG. 40). The application can focus on colors of a specific narrow range in the range of the camera.

The system will be able to work with features the same way that it works with colors. It will also be able to work with both of them together (features and color). Special features will be added to the objects (or will be found automatically). The features will be designed in such a way that they are recognizable from different directions/orientations and distances. Different types of algorithms (such as SIFT, DAISY, etc.) will be used to find the features and create them.

This could satisfy the requirements of a third party that want to insert a new product of its company, into the system.

The item is placed in a cage, and scanned by cameras from many directions and angles, this way the program can build a structure defining the characteristics of the item. The software looks for definite shapes with clear colorings on the.

For instance a plain red ball will only be defined by a red circle on all sides, this is a very "poor" item as only its x, y projection on the focal plane can be identified: no orientation signs are on the item and the distance cannot be identified as the camera resolution is unknown. The identification of the item is also very poor as any red patch in the background could be identified as the item.

Adding latitude lines in a bright green color can certainly improve the quality of the item in being recognized and to retrieve its orientation. Adding a stick to the ball can help to calculate the location of the ball.

Mouse Click

On some of the objects a set of buttons can be added to emulate a mouse click.

Specifically on the 'Wand' a push button is added on the hilt. When the button is pressed a small light is turned on at the tip of the 'Wand'. This enables the user to choose or drag as easily and naturally as with a mouse click. This feature is very important and replaces the complicated methods adopted in applications that use hand recognition.

One of the elements on the item should be a colorful semi-transparent plastic piece, and in it a light controlled by a pushbutton.

After the object is identified, as the object location and orientation are already defined, the program can easily calculate where the light socket should be; Then check whether the element is lit or not.

Runtime Calibration

The input image is received from a simple 2D color camera. If the camera parameters are not known a calibration program can run to calibrate these parameters.

Providing we have a frame capture of an object, and the object is identified from a side with n elements.

For the identified side of the object there are n identifiable elements.

From the 'Object Description' file we retrieve for each of the elements the coordinates of the center of the element in relation to the object axis.

$M_o$ is a matrix of n element coordinates in relation to the object axis.

Based on the projected location of each element in the 2D image frame:

m is a matrix for all n projections.
M is a matrix of the elements in camera coordinates.
using the rotation matrix R the translation vector T:

$$M_o = \{R|t\}M$$

Base on the projection operator A that projects from the real 3D word into the image frame:

$$m = AM_o$$

Rounded elements can be used by calculating there diameter that stays

Constant when the object is tilted.

The calculation of the calibrated parameters may be performed whenever the system arises and when a different camera is chosen. But every certain interval of time when the object is identified clearly, another interaction of calibration calculation is triggered.

The camera is treated as a pinhole camera model.

Each point in space at location M={X,Y,Z} is projected to a point m={u,v} in pixels on the image plane.

The transformation consists of transposing the location by T, rotating it by R and projecting it using A.

$$sm' = A[R|t]M'$$

or $$s\begin{bmatrix}u\\v\\1\end{bmatrix} = \begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

where:
A—is a camera matrix, or a matrix of intrinsic parameters
(cx, cy)—is a principal point that is usually at the image center
fx, fy—are the focal lengths expressed in pixel units.

Thus, if an image from the camera is scaled by a factor, all of these parameters should be scaled (multiplied/divided, respectively) by the same factor. The matrix of intrinsic parameters does not depend on the scene viewed. So, once estimated, it can be re-used as long as the focal length is fixed (in case of zoom lens).

The rigid object translation, [R|t], of a marker at point (X,Y,Z) on the object to its final location in respect to a still camera. The transformation above is equivalent to the following (when z≠0):

$$\begin{bmatrix}x\\y\\z\end{bmatrix} = R\begin{bmatrix}X\\Y\\Z\end{bmatrix} + t$$

$$x' = x/z$$

$$y' = y/z$$

$$u = f_x * x' + c_x$$

$$v = f_y * y' + c_y$$

By identifying a number of specific markers on the object we can estimate intrinsic and extrinsic camera parameters from several views (every view is described by several 3D-2D point correspondences).

In the example of the wand, the points to be analyzed are the corner points between the colored elements (see FIG. 45). As the wand is of a cylindrical shape, the angle around the wands axis is irrelevant and the coordinates of these points in the object axis are known.

Implementations

The invention is an input device and driver that can be embedded in different products.

Figure 41:
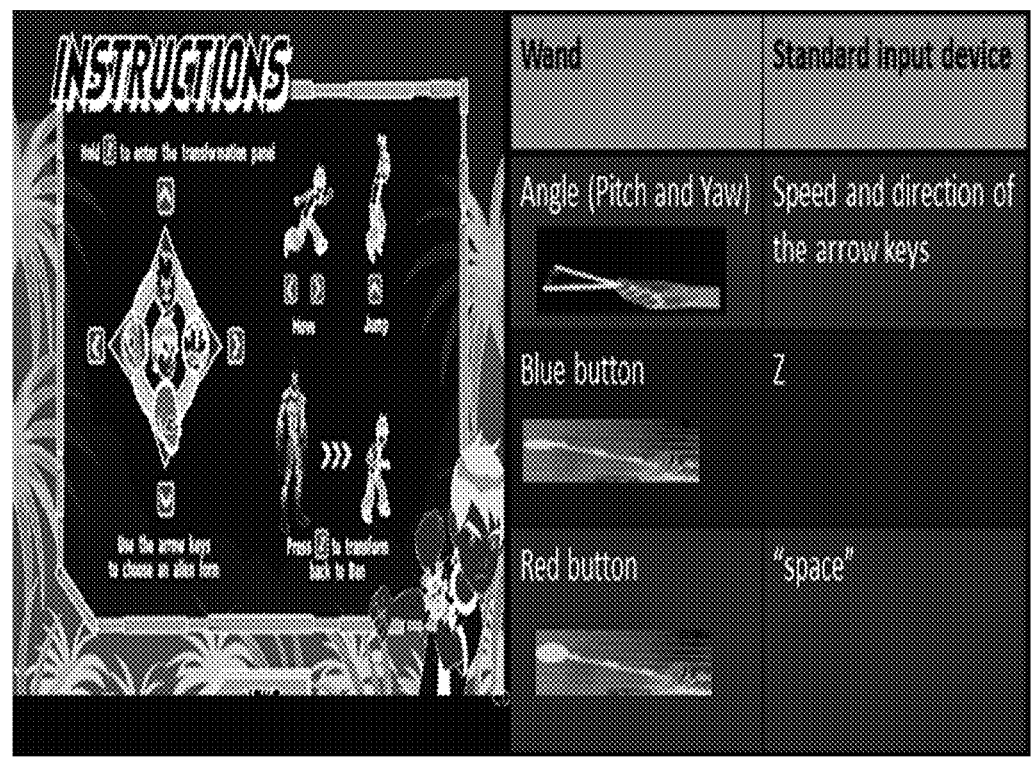
FIG. 41 Implementation of emulation of standard input (keyboard) according to an embodiment of the invention.

Emulation of standard input (FIG. 41): Many games and applications on and off the web, are controlled by a few standard input devices (in FIG. 3 only the arrows, 'Z' and 'Space' on the keyboard. By matching certain actions of the users object to emulate the required input, the user can stand at a distance and control the game from afar with match more action.

Figure 42:
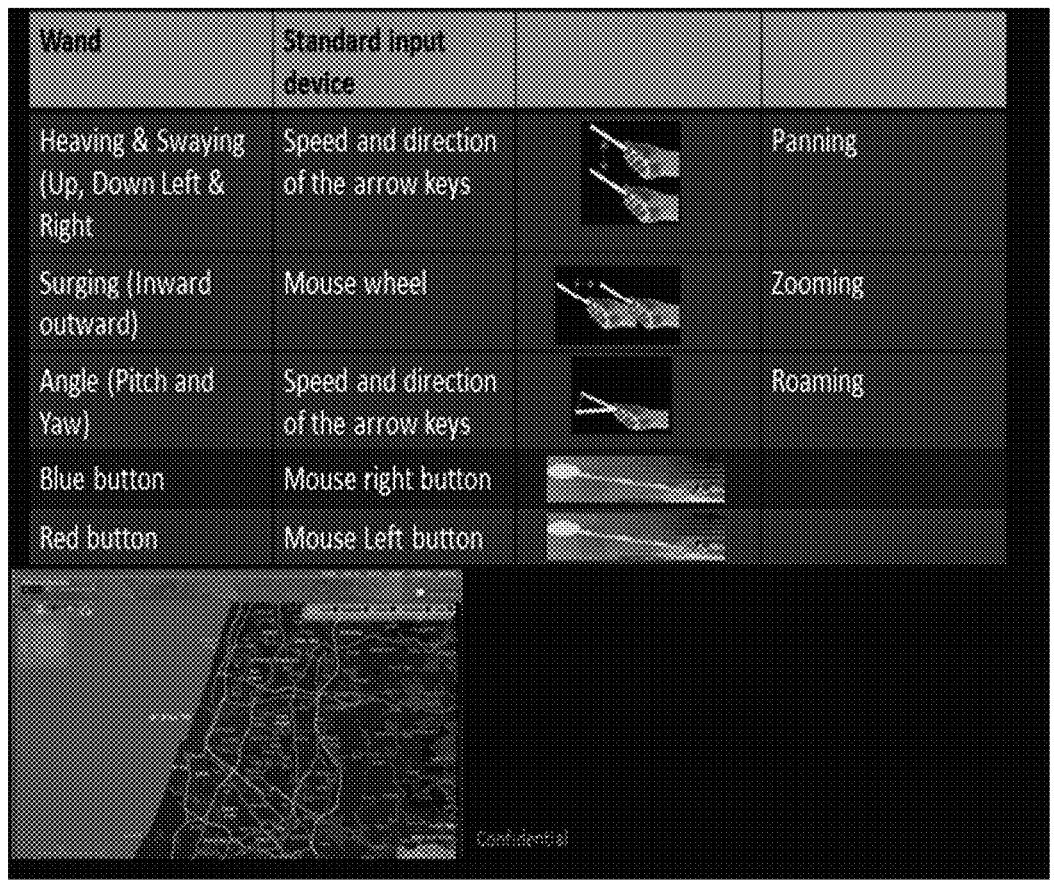
FIG. 42 Implementation of emulation of standard input using all dimensions according to an embodiment of the invention.

More complex applications such as a map navigator (FIG. 42) use the advantage of six dimensions. The user moves a general object such as a wand or pen, to pan the map by moving sideways and up and down, move in the map by tilting the object to point at the target and zooming by moving inwards and outwards. All these actions are translated to the required standard input device to emulate the function.

In addition the button can trigger more complex specific functionalities that the program allows.

Figure 43:
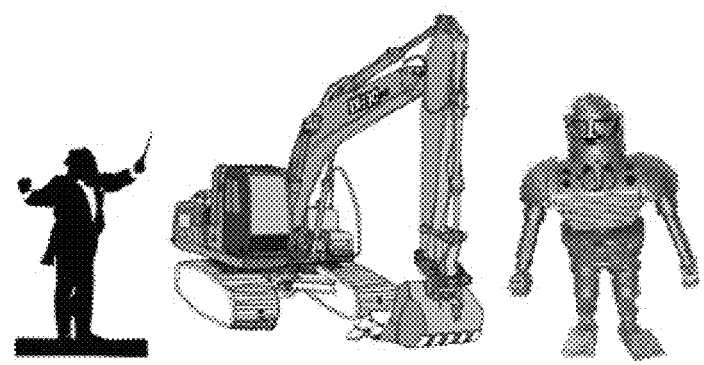
FIG. 43 includes examples of implementing the invention translating the result to a servo unit: operating machinery or robots according to an embodiment of the invention.

In FIG. 43 there is no display unit, the action of the object, controlled by the user, is translated to movement of a robot, a heavy duty machine or other physical outputs.

FIG. 44 the output unit is Audio (no display needed). The object can be translated into sounds, notes of higher and lower pitch, stronger or weaker, just by maneuvering the object held by the user. Different objects can be the source of different instrument sounds, each instrument object produces a sound only when the button is pressed, moving the object up and down for high and lower tones, in and out for volume sidewise for treble.

Another Audio implementation is to use the device to conduct a virtual orchestra. The melody is set but the user points at the instruments to direct there tempo and volume.

Figure 46:
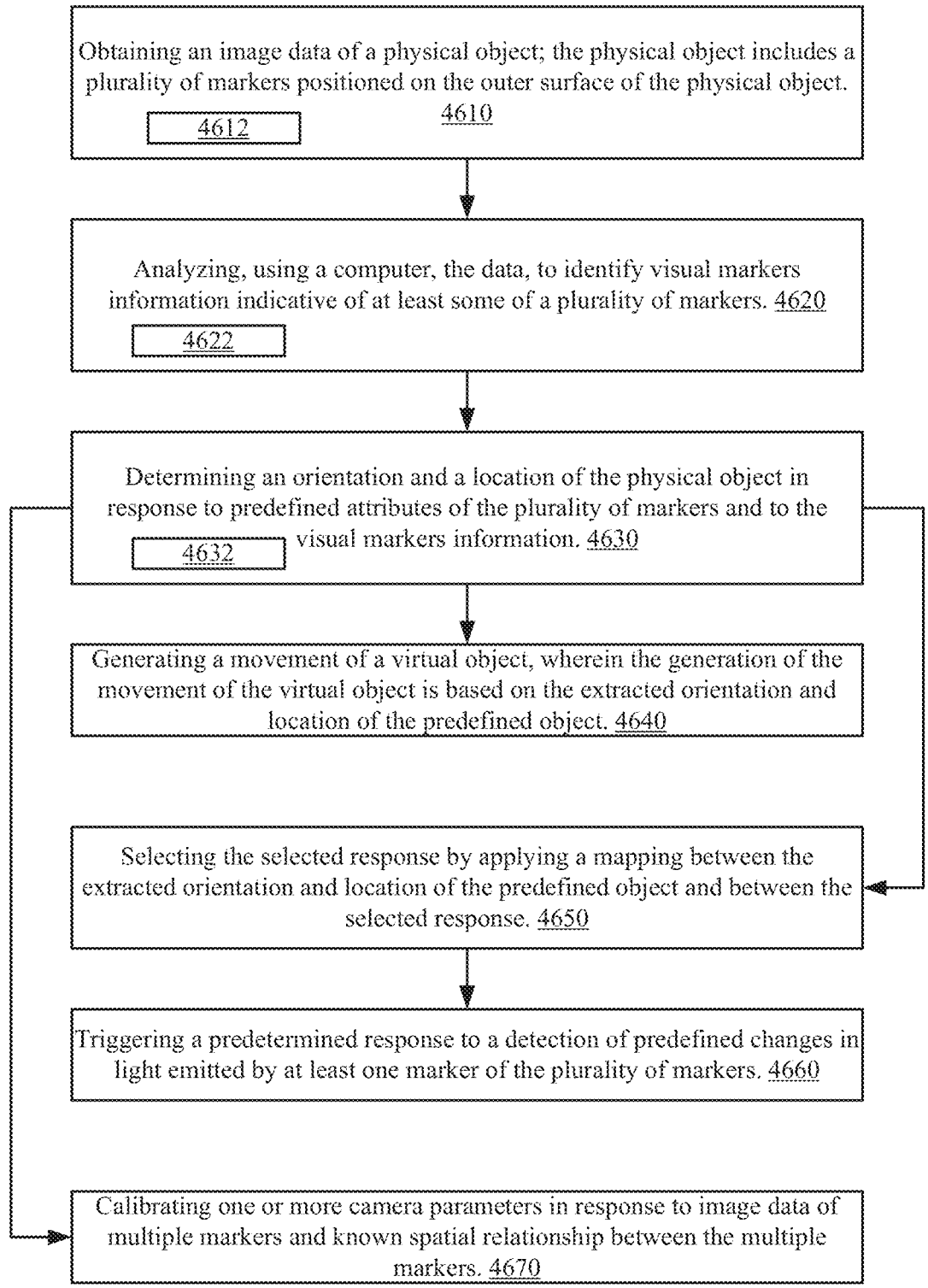
FIG. 46 illustrated a method according to an embodiment of the invention.

FIG. 46 illustrates method 4600 according to an embodiment of the invention.

Method 4600 may start by sequence of stages 4610, 4620 and 4630.

Obtaining (4610) an image data of a physical object; the physical object includes a plurality of markers positioned on the outer surface of the physical object.

Analyzing (4620), using a computer, the data, to identify visual markers information indicative of at least some of a plurality of markers.

Determining (4630) an orientation and a location of the physical object in response to predefined attributes of the plurality of markers and to the visual markers information.

Stage 4630 may be followed by generating (4640) a movement of a virtual object, wherein the generation of the movement of the virtual object is based on the extracted orientation and location of the predefined object.

The plurality of markers may maintain a fixed spatial relationship.

The image data may include visual information indicative of a movement of the predefined object; and tracking a movement of the predetermined object.

The visual information indicative of the movement of the predefined object may include radiation emitted from at least one of the plurality of markers.

The visual information may include a blurred image of the predefined object.

The image data may not include an identifiable image of the predefined object.

The analyzing (4620) may include searching in the image data image patterns that match expected image patterns to be formed by the plurality of markers.

The method may include triggering (4660) a predetermined response to a detection (being a part of stage 4620) of predefined changes in light emitted by at least one marker of the plurality of markers.

The method may include selecting a selected filtering process to be applied during the analyzing of the image data and applying the selected filtering process. The selection may be based upon an application.

The method may include triggering a selected response to the extracted orientation and location of the predefined object.

The method may include selecting (4650) the selected response by applying a mapping between the extracted orientation and location of the predefined object and between the selected response.

The selecting (4650) may include selecting mapping out of multiple mappings.

The method may include analyzing (as part of stage 4620) the data to detect an optical code formed by multiple predefined emissions of light by the object during a time window.

The method may include calibrating (4670) one or more camera parameters in response to image data of multiple markers and known spatial relationship between the multiple markers.

Stage 4610 may include obtaining (4612) image data of a plurality of physical objects; each physical object may include a plurality of markers positioned on the outer surface of the physical object. Stage 4620 may include analyzing (4622), using a computer containing the object description file, the data, to identify visual markers information indicative of at least some of a plurality of markers of the plurality of physical objects. Stage 4630 may include determining (4632) an orientation and a location of each of the plurality of physical object in response to predefined attributes of the plurality of markers of the physical object and to the visual markers information.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/ output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method, comprising:
obtaining, from a two dimensional camera image data of a physical object wherein the physical object and comprises a plurality of markers positioned on the outer surface of the physical object; wherein at least a given marker of the plurality of markers is configured to emit radiation;
analyzing, using a computer, the image data, to identify visual markers information indicative of at least some of a plurality of markers;
searching for a path generated by the radiation emitted by the given marker;
wherein when the image data comprises blurred images of the physical object or does not comprise identifiable images of the physical object then tracking a movement of the physical object using the path generated by the radiation emitted by the given marker; and
wherein when the image data comprises non-blurred and identifiable images of the physical object then determining an orientation and a location of the physical object in response to predefined attributes of the plurality of markers and to the visual markers information.

2. The method according to claim 1 wherein the physical object differs from a handheld controller.

3. The method according to claim 1 wherein the plurality of markers maintain a fixed spatial relationship.

4. The method according to claim 1 further comprising determining that the physical object is not static but moves at a velocity that is below the velocity that causes images of the object to be blurred; and tracking a movement of the physical object.

5. The method according to claim 1 wherein the radiation is light.

6. The method according to claim 1 wherein multiple markers of the plurality of markers emit visible light of different colors.

7. The method according to claim 1 wherein the analyzing comprises searching in the image data image patterns that match expected image patterns to be formed by the plurality of markers.

8. The method according to claim 1 comprising triggering a predetermined response to a detection of predefined changes in light emitted by at least one marker of the plurality of markers.

9. The method according to claim 1 further comprising selecting a selected filtering process to be applied during the analyzing of the image data and applying the selected filtering process.

10. The method according to claim 9 wherein the selection is based upon an application.

11. The method according to claim 1 comprising triggering a selected response to the extracted orientation and location of the predefined object.

12. The method according to claim 11 comprising selecting the selected response by applying a mapping between the extracted orientation and location of the predefined object and between the selected response.

13. The method according to claim 12 comprising selecting a mapping out of multiple mappings.

14. The method according to claim 1 comprising analyzing the data to detect an optical code formed by multiple predefined emissions of light by the object during a time window.

15. The method according to claim 1 comprising calibrating one or more camera parameters in response to image data of multiple markers and known spatial relationship between the multiple markers.

16. The method according to claim 1 comprising:
obtaining image data of a plurality of physical objects; each physical object comprises a plurality of markers positioned on the outer surface of the physical object;
analyzing, using a computer containing the object description file, the data, to identify visual markers information indicative of at least some of a plurality of markers of the plurality of physical objects;
determining an orientation and a location of each of the plurality of physical object in response to predefined attributes of the plurality of markers of the physical object and to the visual markers information.

17. A non-transitory computer readable medium that stores instructions that once executed by a computer cause the computer to perform the stages of:
obtaining, from a two dimensional camera image data of a physical object wherein the physical object and comprises a plurality of markers positioned on the outer surface of the physical object; wherein at least a given marker of the plurality of markers is configured to emit radiation;
analyzing, using a computer, the image data, to identify visual markers information indicative of at least some of a plurality of markers;
searching for a path generated by the radiation emitted by the given marker;
wherein when the image data comprises blurred images of the physical object or does not comprise identifiable images of the physical object then tracking a movement of the physical object using the path generated by the radiation emitted by the given marker; and
wherein when the image data comprises non-blurred and identifiable images of the physical object then determining an orientation and a location of the physical object in response to predefined attributes of the plurality of markers and to the visual markers information.

18. The non-transitory computer readable medium according to claim 17 wherein the physical object differs from a handheld controller.

19. The non-transitory computer readable medium according to claim 17 that stores instructions for determining that the physical object is not static but moves at a velocity that is below the velocity that causes images of the object to be blurred; and tracking a movement of the physical object.

* * * * *